US009788687B2

(12) United States Patent
Frehn et al.

(10) Patent No.: US 9,788,687 B2
(45) Date of Patent: Oct. 17, 2017

(54) SYSTEM AND METHOD FOR COOKING A MEAT PATTY

(71) Applicant: Momentum Machines Company, San Francisco, CA (US)

(72) Inventors: Steven Frehn, San Francisco, CA (US); Alexandros Vardakostas, San Francisco, CA (US); Michael Balsamo, San Francisco, CA (US); Noe Esparza, San Francisco, CA (US); Matthew Williams, San Francisco, CA (US)

(73) Assignee: Momentum Machines Company, San Francisco, CA (US)

( * ) Notice: Subject to any disclaimer, the term of this patent is extended or adjusted under 35 U.S.C. 154(b) by 0 days.

(21) Appl. No.: 15/157,267

(22) Filed: May 17, 2016

(65) Prior Publication Data

US 2016/0331176 A1 Nov. 17, 2016

Related U.S. Application Data

(60) Provisional application No. 62/162,798, filed on May 17, 2015.

(51) Int. Cl.
*H05B 6/12* (2006.01)
*A47J 37/06* (2006.01)
*H05B 6/06* (2006.01)
*A23L 5/10* (2016.01)

(52) U.S. Cl.
CPC .............. *A47J 37/0611* (2013.01); *A23L 5/15* (2016.08); *H05B 6/065* (2013.01); *H05B 6/12* (2013.01); *H05B 6/1272* (2013.01)

(58) Field of Classification Search
CPC ......... A23L 3/005; H05B 6/065; H05B 6/062; H05B 6/1272; H05B 6/12
USPC .......... 99/DIG. 14, 451, 391, 389, 393, 396; 219/620, 622, 624
See application file for complete search history.

(56) References Cited

U.S. PATENT DOCUMENTS 1,471,727 A 10/1923 Gomez
1,621,234 A 3/1927 Carpenter
(Continued)

OTHER PUBLICATIONS

International Search Report and Written Opinion for PCT Application No. PCT/US2016/032915, dated Aug. 18, 2016, 13 pages.

*Primary Examiner* — Reginald L Alexander
(74) *Attorney, Agent, or Firm* — Harness, Dickey & Pierce, P.L.C.

(57) ABSTRACT

One variation of a system for cooking food includes: a griddle module including a lower plate configured to receive a food product and an upper plate arranged over the lower plate and configured to contact the food product; a set of induction stations, each induction station including a lower coil configured to inductively couple to the lower plate when the griddle module is arranged in the induction station and an upper coil configured to inductively couple to the upper plate when the griddle module is arranged in the induction station; a hub configured to support the lower plate and the upper plate between the upper and lower coils of the induction stations and to sequentially position the griddle module through the set of induction stations; and a controller configured to drive the upper and lower coils to heat the food product between the lower plate and the upper plate.

14 Claims, 5 Drawing Sheets

(56) References Cited

U.S. PATENT DOCUMENTS

| | | | | |
|---|---|---|---|---|
| 3,294,946 A | * | 12/1966 | Baermann | F24J 3/00 |
| | | | | 219/622 |
| 3,986,443 A | | 10/1976 | Shimizu | |
| 4,345,514 A | | 8/1982 | Morley | |
| 5,743,173 A | * | 4/1998 | Hayashi | A47J 37/06 |
| | | | | 219/492 |
| 6,483,089 B1 | * | 11/2002 | Wright | A47J 36/2494 |
| | | | | 126/246 |
| 7,989,012 B2 | * | 8/2011 | Gambino | A47J 36/02 |
| | | | | 219/621 |
| 2015/0028022 A1 | | 1/2015 | Moon et al. | |

\* cited by examiner

SYSTEM AND METHOD FOR COOKING A MEAT PATTY

This Application claims the benefit of U.S. Provisional Application No. 62/162,798, filed on 17 May 2015, which is incorporated in its entirety by this reference.

This Application is related to U.S. patent application Ser. No. 14/208,149, filed on 13 Mar. 2014, U.S. patent application Ser. No. 14/534,038, filed on 5 Nov. 2014, and to U.S. patent application Ser. No. 13/911,637, filed on 6 Jun. 2013, all of which are incorporated in their entireties by this reference.

TECHNICAL FIELD

This invention relates generally to the field of food preparation and more specifically to a new and useful system and method for cooking a meat patty in the field of food preparation.

DESCRIPTION OF THE EMBODIMENTS

The following description of the embodiments of the invention is not intended to limit the invention to these embodiments but rather to enable a person skilled in the art to make and use this invention.

1. System

Figure 1:
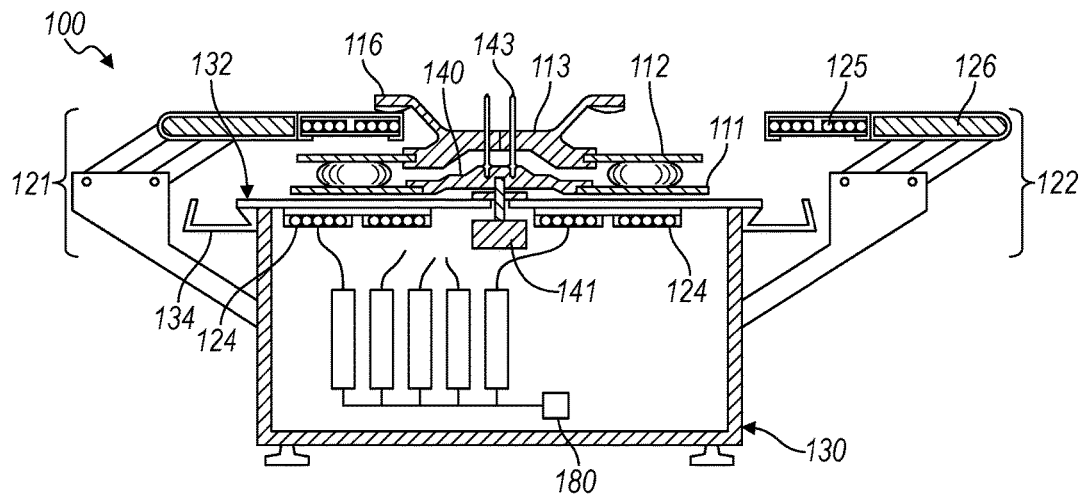
FIG. 1 is a schematic representation of a system.
Figure 2:
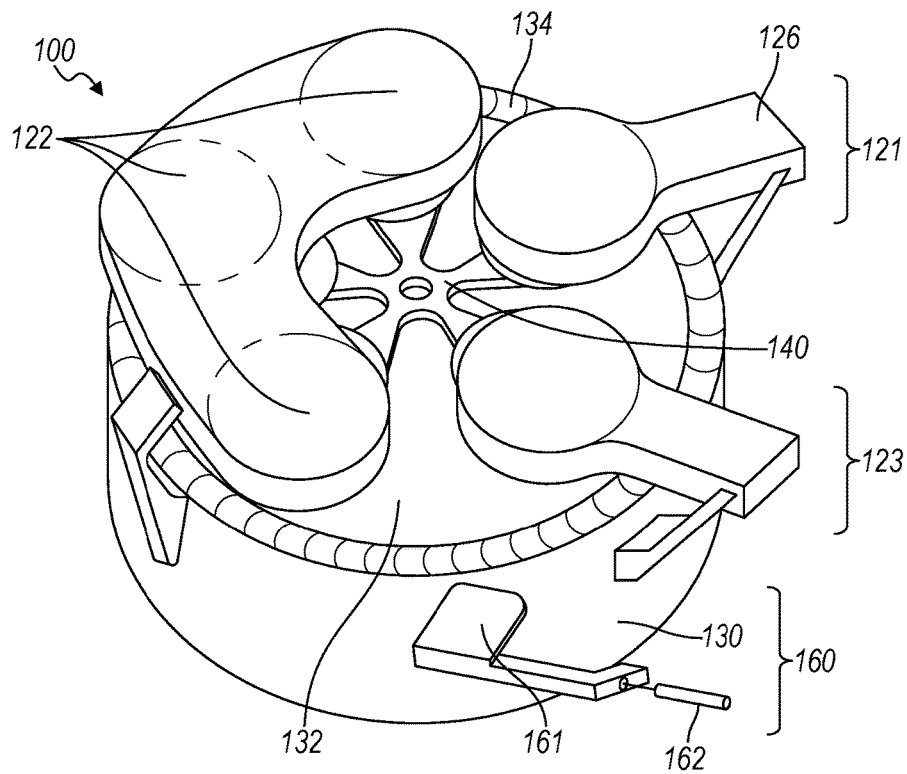
FIG. 2 is a schematic representation of one variation of the system.

As shown in FIGS. 1 and 2, a system 100 for cooking a meat patty includes: a set of griddle modules 110, each griddle module 110 in the set of griddle modules 110 including a lower plate 111 configured to receive a meat patty and an upper plate 112 arranged over the lower plate 111 and configured to contact the meat patty; and a set of induction stations 120 including an entry induction station 121 and an exit induction station 123, each induction station in the set of induction stations 120 including 1) a lower coil 124 configured to inductively couple to an adjacent lower plate 111 and 2) an upper induction head 126 including an upper coil 125 configured to inductively couple to an adjacent upper plate 112. The system 100 also includes: a base 130 including a barrier, housing lower coils 124 of the set of induction stations 120 on a first side of the barrier, and supporting each upper induction head 126 in alignment with a lower coil 124 of a corresponding induction station offset on a second side of the barrier opposite the first side; and a conveyor system including 1) a hub 140 supporting lower plates 111 of the set of griddle modules 110 between the barrier and the upper induction heads 126, the lower plates 111 offset from the barrier and 2) a hub actuator arranged within the base 130 and sequentially indexing each griddle module 110 in the set of griddle modules 110 from the entry induction station 121 to the exit induction station 123. The system 100 further includes: a retrieval system including a paddle and a retrieval actuator, the retrieval actuator selectively advancing the paddle across a lower plate 111 in the exit induction station 123 to collect a patty from the lower plate 111.

Figure 5:
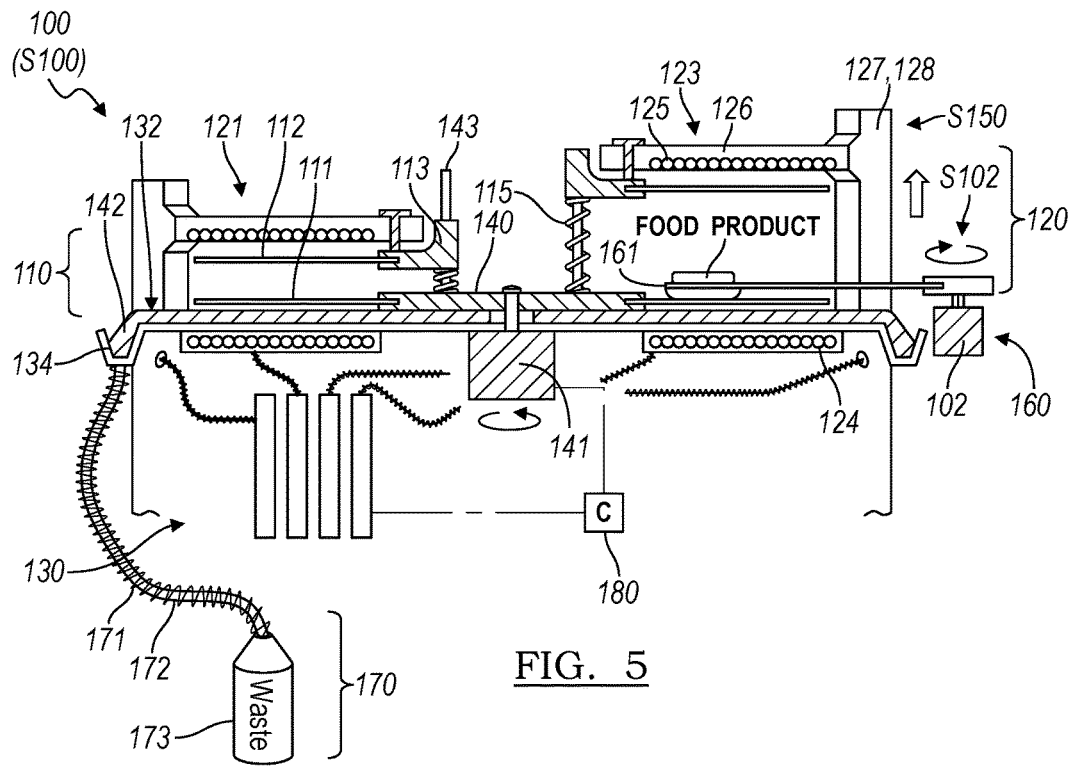
FIG. 5 is a schematic representation of one variation of the system.
Figure 6:
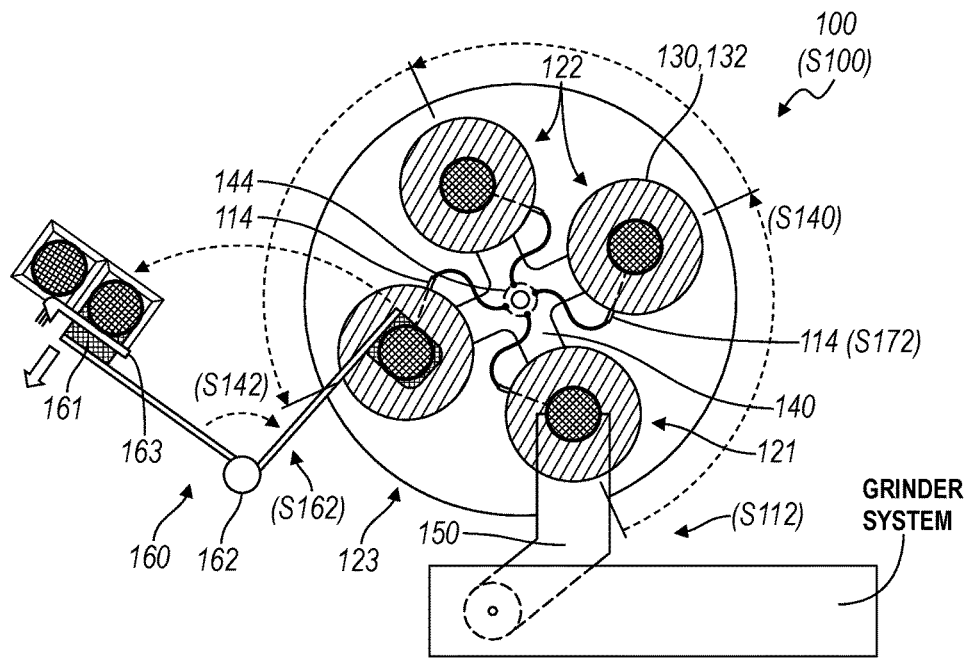
FIG. 6 is a schematic representation of one variation of the system.

As shown in FIGS. 5 and 6, one variation of the system 100 for cooking a food product includes: a first griddle; a second griddle; a set of induction stations 120; a base 130; a hub 140; and a controller 180. In this variation, the first griddle module 110 includes a lower plate 111 configured to receive a first food product and an upper plate 112 arranged over the lower plate 111 and configured to contact the first food product. The set of induction stations 120 includes an entry induction station 121 and an exit induction station 123, wherein each induction station in the set of induction stations 120 includes a lower coil 124 configured to inductively couple to the lower plate 111 when the first griddle module 110 is arranged in the induction station and an upper coil 125 configured to inductively couple to the upper plate 112 when the first griddle module 110 is arranged in the induction station. The base 130 includes a barrier, is configured to support a lower coil 124 of an induction station on a first side of the barrier, and is configured to support an upper coil 125 of an induction station on a second side of the barrier opposite and aligned with the lower coil 124 of the induction station for each induction station in the set of induction stations 120. The hub 140: is configured to support the lower plate 111 and the upper plate 112 of the first griddle module 110 between the barrier and upper coils 125 of the induction stations with the lower plate 111 offset above the barrier and the upper plate 112 offset below upper coils 125 of the induction stations; and is configured to sequentially position the first griddle module 110 through the set of induction stations 120 from the entry induction station 121 to the exit induction station 123. In this variation, the controller 180 is configured to drive lower coils 124 and upper coils 125 of the set of induction stations 120 based on a position of the first griddle module 110 within the set of induction stations 120 to heat the first food product between the lower plate 111 and the second plate.

2. Method

Figure 7:
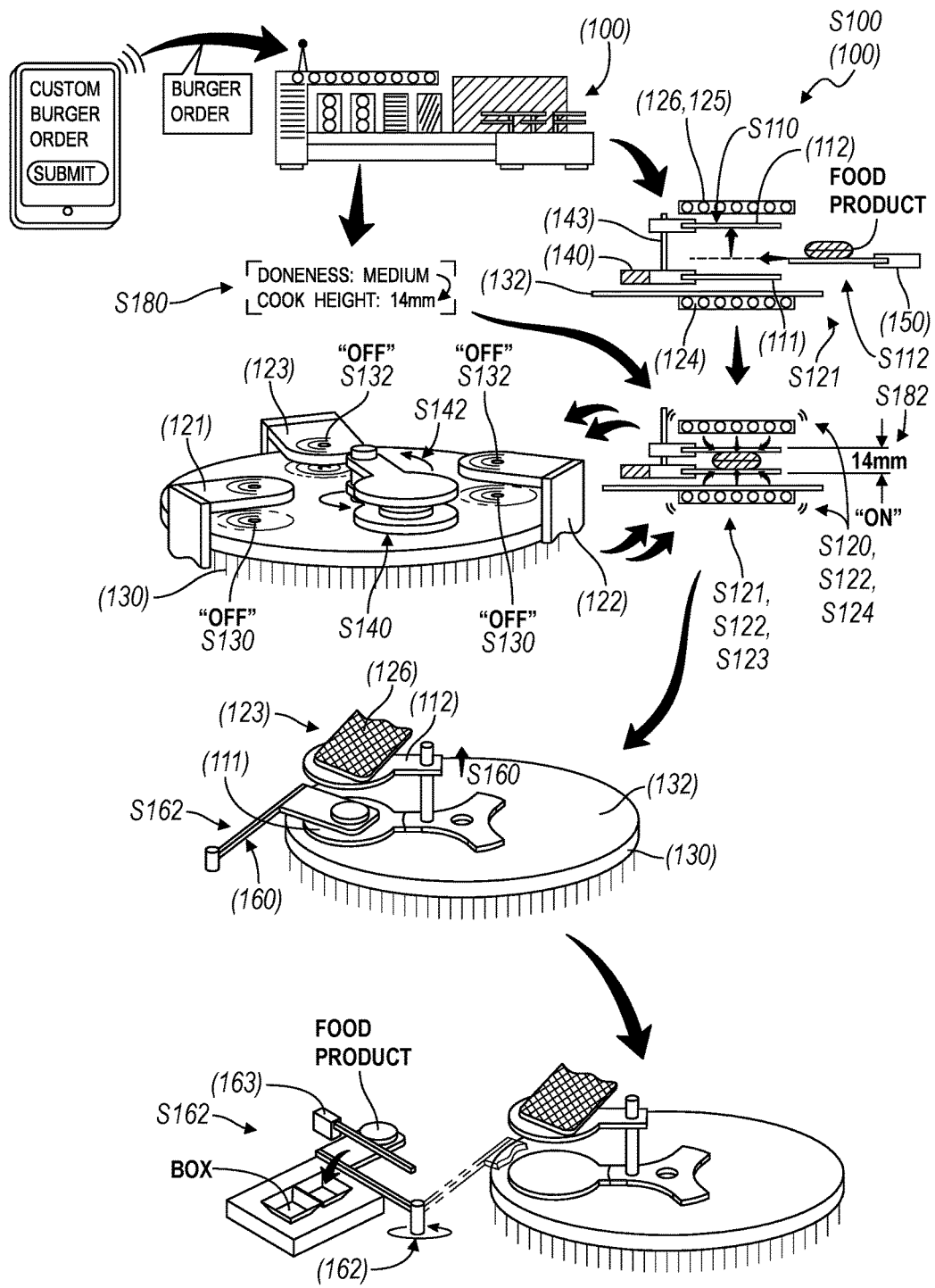
FIG. 7 is a flowchart representation of a method.
Figure 8:
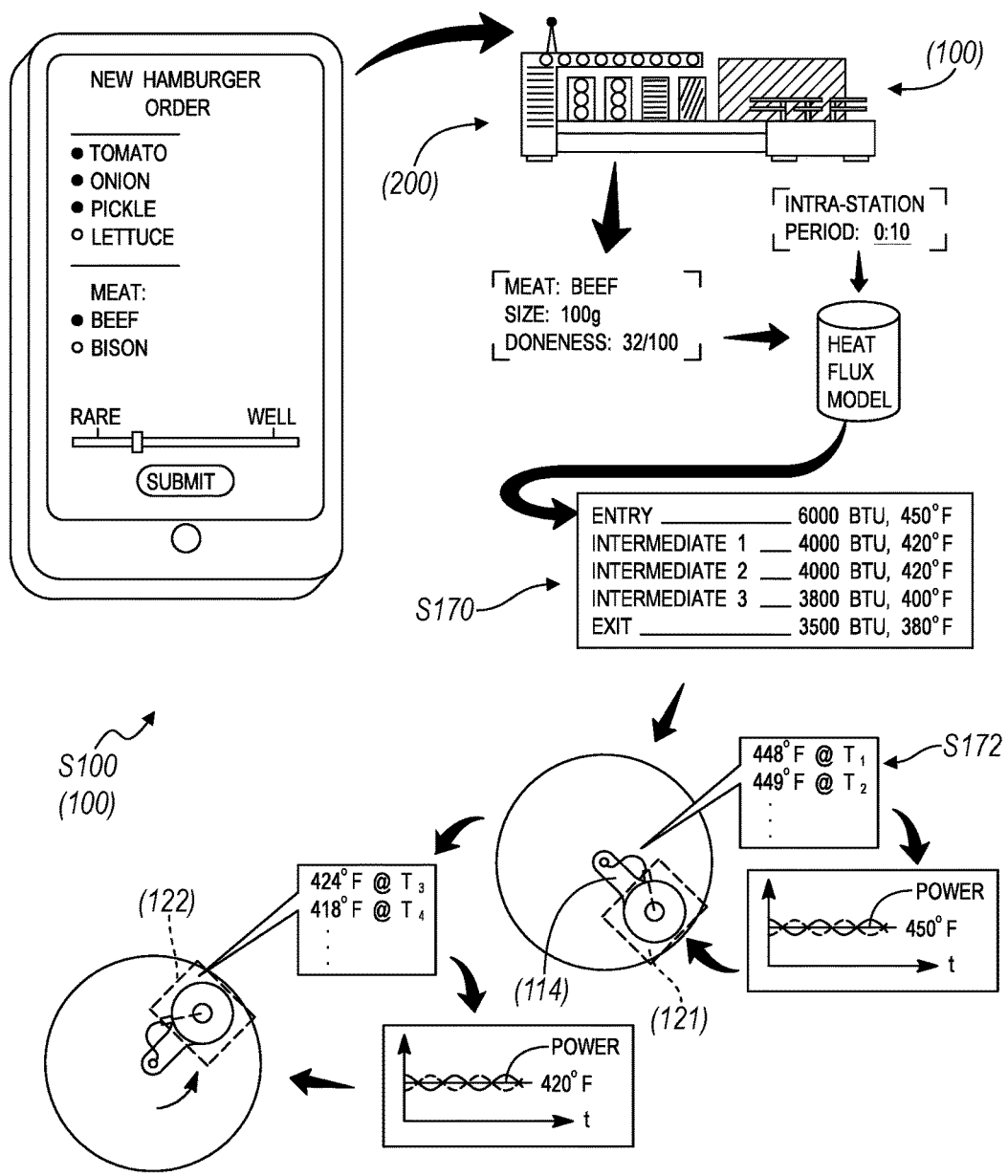
FIG. 8 is a flowchart representation of one variation of the method.

As shown in FIGS. 7 and 8, a method S100 for cooking a meat patty includes: elevating an upper induction head at an entry station to separate a first upper plate from a first lower plate at the entry station in Block S110; dispensing a meat patty onto the lower plate in Block S112; at a first time, powering a lower coil at the entry station to induction heat the first lower plate and powering an upper coil at the entry station to induction heat the first upper plate in Block S120; disabling the upper and lower coils at the entry station in Block S130; indexing a hub to shift the first lower plate and the first upper plate to an intermediate station and to shift a second lower plate and a second upper plate to the entry station in Block S140; at a second time succeeding the first time, powering a lower coil at the intermediate station to induction heat the first lower plate and powering an upper coil at the intermediate station to induction heat the first upper plate in Block S122; disabling the upper and lower coils at the intermediate station in Block S132; indexing the hub to shift the first lower plate and the first upper plate to an exit station in Block S142; at a third time succeeding the second time, powering a lower coil at the exit station to induction heat the first lower plate and powering an upper coil at the intermediate station to induction heat the first upper plate in Block S124; elevating an upper induction head at the exit station to separate the first upper plate from the first lower plate at the exit station in Block S160; and removing the meat patty from the first lower plate at the exit station in Block S162.

One variation of the method 100 includes: separating a first upper plate of a first griddle module from a first lower plate of the first griddle module positioned within an entry induction station in Block S110; dispensing a first food product onto the first lower plate in Block S112; during a first period of time, driving a lower coil in the entry induction station to heat the first lower plate and driving an upper coil in the entry induction station to heat the first upper plate in Block S120; during a second period of time succeeding the first period of time, disabling the lower coil and the upper coil in the entry induction station in Block S130; during the second period of time, positioning the first griddle module within an intermediate induction station in Block S140; during a third period of time succeeding the second period of time, driving a lower coil in the intermediate induction station to heat the first lower plate and driving an upper coil in the intermediate induction station to heat the first upper plate in Block S122; during a fourth period of time succeeding the third period of time, disabling the lower coil and the upper coil in the intermediate induction station in Block S132; during the fourth period of time, positioning the first griddle module within an exit induction station in Block S142; during a fifth period of time succeeding the fourth period of time, driving a lower coil in the exit induction station to heat the first lower plate and driving an upper coil in the exit induction station to heat the first upper plate in Block S124; at a sixth time succeeding the fifth period of time, separating the first upper plate from the first lower plate of the first griddle module positioned within the exit induction station in Block S160; and removing the first food product from the first lower plate in Block S162.

The foregoing variation of the method 100 can also include: during the third period of time: separating a second upper plate of a second griddle module from a second lower plate of the second griddle module positioned within the entry induction station, dispensing a second food product onto the second lower plate, and driving the lower coil in the entry induction station to heat the second lower plate and driving the upper coil in the entry induction station to heat the second upper plate; during the fourth period of time, disabling the lower coil and the upper coil in the entry induction station; during the fourth period of time, simultaneously positioning the second griddle module within the intermediate exit induction station; and during the fifth period of time, driving the lower coil in the intermediate induction station to heat the second lower plate and driving the upper coil in the intermediate induction station to heat the second upper plate.

3. Applications

The system 100 for cooking a food product (e.g., a hamburger patty, a steak) functions to receive a food product between upper and lower plates of a griddle module, to compress the food product between the upper and lower plates of the griddle module, to sequentially advance the griddle module through each induction station in a set of induction stations, and to sequentially power upper and lower induction coils of each induction station based on the position of the griddle module to heat the upper and lower plates of the griddle module, thereby heating (e.g., cooking) the food product. The system 100 then removes the food product from the griddle module once the griddle module has entered or passed through a last induction station.

The system 100 can also include a set of (e.g., five) griddle modules, such as one griddle module for each induction station. For example, the system 100 can receive a first food product at a first griddle module arranged in an entry induction station while a second, a third, and a fourth food product are heated between upper and lower plates of second, third, and fourth griddle modules in second, third, and fourth induction stations, respectively, and while a fifth food product is removed from a fifth griddle module in an exit induction station. In this example, once the first food product is inserted into the first griddle module and initially heated in the first induction station, the system 100 can deactivate all coils in all induction stations before indexing the griddle modules forward in order to position the first griddle module in the second induction station, to position the second griddle module in the third induction station, to position the third griddle module in the fourth induction station, to position the fourth griddle module in the exit induction station, and to position the fifth griddle module in the entry induction station. As the second induction station heats the first food product between the upper and lower plates of the first griddle module, the system wo places a sixth food product into the fifth griddle module in the entry induction station and removes the fourth food product from the fourth griddle module in the exit induction station. The system 100 can then repeat this process over time to continuously receive food products at griddle modules in the entry induction station, to sequentially heat (or cook) food products from the entry induction station through the exit induction station, and to retrieve heated (or cooked) food products from griddle modules in the exit induction station. In this example, the system 100 can receive a sequence of hamburger patties from a patty grinding system, sequentially insert hamburger patties into griddle modules in the entry induction station, simultaneously cook multiple hamburger patties to various doneness levels at each induction station, and remove done hamburger patties from griddle modules at the exit induction station.

As a griddle module containing a food product is indexed from the entry induction station through to the exit induction station, as shown in FIG. 7, the system 100 can also modulate a power output at each induction station in order to achieve a target doneness for the food product. For example, when the griddle module in the entry induction station receives a hamburger patty assigned a medium doneness level, the system 100 can implement closed-loop feedback techniques to modulate the power outputs of the upper and lower coils in the entry induction station based on outputs of temperature sensors thermally coupled to the upper and lower plates in the griddle module in order to maintain a target entry stage temperature for a medium doneness level. In this example, once the griddle module is indexed to a second induction station, the system 100 can again implement closed-loop feedback techniques to modulate the power outputs of the upper and lower coils in a second induction station based on outputs of temperature sensors thermally coupled to the upper and lower plates in the griddle module in order to maintain a target second stage temperature for a medium doneness level. In this example, the system 100 can repeat this process until the hamburger patty is fully cooked to a medium doneness level at the exit induction.

Furthermore, the system 100 can actively control compression of a food product between the upper and lower plates of a griddle module in order to achieve a doneness level assigned to the food product. For example, the system 100 can include a compression actuator 128 configured to drive the upper and lower plates of a griddle module together to increase the cook rate of a hamburger patty arranged in the griddle module, thereby yielding a hamburger patty of a greater doneness level upon completion of a cook cycle. The system 100 can similarly control the compression actuator 128 to separate the upper and lower plates of a griddle module in order to decrease the cook rate of a hamburger patty arranged in the griddle module, thereby yielding a hamburger patty of a lesser doneness level upon completion of a cook cycle. Alternatively, the system 100 can actively adjust a stop in a griddle module in order to set a minimum offset distance between the bottom face of an upper plate and the top face of a corresponding lower plate of a griddle module based on a doneness level assigned to a food product. The system 100 can thus control one or more cook parameters, such as temperature and compression, to cook a food product—within a griddle module—to a target doneness or to a target temperature independent of other food products cooking in other griddle modules in the system 100.

Upon completion of a cook cycle at a griddle module (i.e., upon advancement of the griddle module from the entry induction station through to the exit induction station), the system 100 can then remove a heated or cooked food product from the griddle module. For example, for the food product that includes a hamburger patty, the system 100 can remove the hamburger patty from a griddle module in the exit induction station and dispense the hamburger patty onto a hamburger bun nearby in preparation for delivering a completed hamburger to a patron according to a custom hamburger order recently submitted by the patron.

The system 100 is described herein as a system for cooking raw hamburger patties. However, the system 100 can additionally or alternatively cook or heat: vegetable patties; raw patties of ground fish, poultry, pork, lamb, or bison, etc.; raw beef, fish, bison, or lamb, etc. steaks; raw chicken breasts; cooked or uncooked sausage; and/or any other raw, semi-cooked, or cooked food product of any other geometry and can dispense such a food product onto any other cooking surface, heating surface, hamburger bun, bread slice, bed of greens, plate, bowl, or other container or surface upon completion of a cook cycle.

4. Automated Food Assembly Apparatus

The system 100 can function as a subsystem within an automated foodstuff assembly apparatus 200 including one or more other subsystems that automatically prepare, assemble, and deliver foodstuffs according to custom food orders submitted by local and/or remote patrons. For example, the automated foodstuff assembly apparatus 200 can include: a bun dispenser and slicing subsystem that slices and dispenses a bun from a bun hopper; a bun buttering subsystem that applies butter to each side of the sliced bun prior to toasting the halves of the bun; a bun toaster subsystem that toasts each side of the bun; a topping module that loads a custom set of toppings in custom quantities onto the bun heel according to topping specifications in a custom food order received from a patron; a condiment subsystem that loads condiments onto the bun crown according to condiment specifications in the custom food order; a patty grinding system that grinds a quantity of raw meat (e.g., based on a custom patty size and a custom meat blend specified in the custom food order) and that presses this quantity of meat into a custom hamburger patty (e.g., to a compression level corresponding to a custom doneness level specified in the custom food order); the system 100 functioning as a patty cooking subsystem that cooks the hamburger patty received from the patty grinding system according to the custom doneness level specified in the custom food order and dispenses the cooked hamburger patty onto the bun heel; and a boxing subsystem that closes the completed hamburger within a paper box for subsequent delivery to the corresponding patron.

The system 100 can cook hamburger patties or veggie patties (e.g., from raw or cooked vegetables) for assembly into other types of assembled foodstuffs, such as sandwiches, hotdogs, burritos, tacos, salads, or wraps, etc. according to custom food orders submitted by patrons to a restaurant, food truck, convenience store, grocery store, or food kiosk, etc. housing an automated foodstuff assembly apparatus. The system 100 can therefore be incorporated into an automated foodstuff assembly apparatus 200 to automatically cook whole or ground meat or vegetable products once an order for a hamburger (or other foodstuff) is submitted by a patron and while other components of the patron's order are processed at the automated foodstuff assembly apparatus.

5. Cook Cycle

The system executes the method 100 during a cook cycle to receive a sequence of food products (e.g., hamburger patties) and to move each food product through the set of induction stations to simultaneously but independently cook each food product before releasing a food product, such as onto a corresponding hamburger bun or into a box.

Block S110 of the method 100 recites separating a first upper plate of a first griddle module from a first lower plate of the first griddle module positioned within an entry induction station. Generally, in Block S110, the system 100 separates an upper plate from a lower plate of a first griddle module in the entry induction station in preparation to load the first griddle module with a food product. In one implementation, the entry induction station includes an upper induction head that houses the upper coil of the entry induction station and an entry elevation actuator 127 configured to (linearly or arcuately) lift the upper induction head of the entry induction station away from the base. For example, the upper induction head in the entry induction station can run vertically on a set of linear rails, and the entry elevation actuator can include a linear actuator oriented vertically between the base and the upper induction head and configured to drive the upper induction head vertically along linear rails. In this implementation, a first receiver coupled to the hub and supporting the upper plate of the first griddle module includes a skid 116 that contacts the upper induction head (or vice versa) such that the first receiver and upper plate rise with the upper induction head when the entry elevation actuator lifts the entry induction head, thereby separating the upper plate of the first griddle module from its corresponding lower plate in preparation to receive a food product in Block no. Alternatively, the system 100 can include an entry elevation actuator at the entry induction station that engages the upper plate of the first griddle module directly (or that engages the first receiver of the hub directly) to lift the upper plate away from the lower plate of the first griddle module. Yet alternatively, the system 100 can include one entry elevation actuator per griddle module and mounted to the hub between the hub and the upper plate of a corresponding griddle module. However, the system 100 can include any other one or more actuators, linkages, etc. configured to elevate the upper induction head in the entry induction station and/or the upper plate of the first griddle module positioned in the entry induction station in any other way.

Block S112 of the method 100 recites dispensing a first food product onto the first lower plate in Block S112.

Generally, the system 100 executes Block S112 once the upper and lower plates of the first griddle module in the entry induction station are opened to receive the food product in Block S110. In one implementation, an adjacent patty grinding system extends a patty dispenser—with hamburger patty—between the upper and lower plates of the first griddle module and releases the hamburger patty onto the lower plate. The system 100 then lowers the upper plate of the first griddle module, such as by lowering the upper induction head in the entry induction station, to bring the upper plate in contact with the hamburger patty.

Block S120 of the method 100 recites, during a first period of time, driving a lower coil in the entry induction station to heat the first lower plate and driving an upper coil in the entry induction station to heat the first upper plate. Generally, in Block S120, the system 100 begins to heat (e.g., cook) the first food product now positioned between the upper and lower plates of the first griddle module by supplying power to the upper and lower coils in the entry induction station. In particular, when powered, the upper and lower coils of the entry induction station inductively couple with the upper and lower plates of the first griddle module, respectively, thereby inducing eddy currents and heating the upper and lower plates, which conduct heat into the top and bottom of the food product, respectively.

During a second period of time succeeding the first period of time, the system 100: disables the lower coil and the upper coil in the entry induction station in Block S130; and positions the first griddle module within an intermediate induction station in Block S140. Generally, the system 100 disables the upper and lower coils in the entry induction station in Block S130 in preparation to advance the first griddle module to a next induction station in Block S140. In particular, to prevent inductive coupling between the upper and lower coils of the entry induction station, which may damage the upper and lower coils, when the first griddle module is transitioned out of the entry induction station, the system 100 disables (e.g., deactivates, cuts power to) the upper and lower coils in Block S130 before advancing the first griddle module to a next induction station. For example, the system 100 can initiate a timer for a static intra-station period (e.g., ten seconds) once the first griddle module enters the first induction station and then deactivate the upper and lower coils of the entry induction station in Block S130 upon expiration of the timer before advancing the first griddle module into a next induction station.

Block S122 of the method 100 recites, during a third period of time succeeding the first period of time, driving a lower coil in the intermediate induction station to heat the first lower plate and driving an upper coil in the intermediate induction station to heat the first upper plate. Generally, in Block S122, the system 100 implements methods and techniques like Block S120 described above to power the upper and lower coils of a second induction station (e.g., an intermediate induction station), which inductively couple to the upper and lower plates of the first griddle module, respectively, to heat the first food product.

Furthermore, the system 100 can include a hub that supports both a first griddle module and a second griddle module behind (i.e., lagging, succeeding) the first griddle module such that, when the system 100 advances the first griddle module forward from the entry induction station to the second induction station, the second griddle module is simultaneously advanced from the exit induction station to the entry induction station. Thus, during the third period of time in which the system 100 powers the upper and lower coils in the second induction station to heat the first food product in the first griddle module in Block S122, the system 100 can repeat Block S110 to separate the upper plate from the lower plate in the second griddle module and can repeat Block S112 to dispense a second food product (e.g., a second hamburger patty) onto the lower plate of the second griddle module. The system 100 can then lower the upper plate of the second griddle module onto the second food product and simultaneously supply power to both the upper and lower coils of the second induction station and the upper and lower coils of the entry induction station, thereby heating the upper and lower plates of the first and second griddle modules, respectively, during the remainder of the third period of time.

For example, the system 100 can power the upper and lower coils of the second induction station for a full intra-station period of ten seconds in Block S122 while simultaneously opening the upper and lower plates of the second griddle module, loading a second food product into the second griddle module, and closing the second griddle module for a subset of the intra-station period (e.g., five seconds) in Blocks S110 and S112 and then powering the upper and lower coils of the first induction station for the remainder of the intra-station period in Block S120. In this example, upon expiration of the intra-station period, the system 100 can deactivate the upper and lower coils in the second and first induction stations in Block S132 and simultaneously advance the first griddle module to a third induction station (e.g., to the exit induction station), the second griddle module to the second induction station, and a third griddle module to the entry induction station. The system 100 can then repeat Blocks S110 and S112 to load a third food product into the third griddle module while simultaneously powering the upper and lower coils in the third and second induction stations to heat the first food product in the first griddle module and to heat the second food product in the second griddle module, respectively, during a second intra-station period. The system 100 can repeat the foregoing methods and techniques to load a food product onto a griddle module as each griddle module enters the entry induction station, to advance each griddle module through the set of induction stations to the exit induction station, and to intermittently power the upper and lower coils of the induction stations to heat food products arranged in adjacent griddle modules.

Block S160 of the method 100 recites, at a sixth time succeeding the fifth period of time, separating the first upper plate from the first lower plate of the first griddle module positioned within the exit induction station; and Block S162 of the method 100 recites removing the first food product from the first lower plate. Generally, in Blocks S160 and S162, the system 100 implements methods and techniques similar to those of Blocks S110 and S112 to open the first griddle module—now positioned in the exit induction station—and to remove the first food product—now fully heated or cooked—from the first griddle module. In one implementation, the exit induction station includes an upper induction head configured to house the upper coil, the system 100 includes an exit elevation actuator—like the entry elevation actuator—configured to elevate the upper induction head of the exit induction station, and the first griddle module includes a skid 116 that engages a feature on the upper induction head of the exit induction station to vertically couple the first griddle to the upper induction head when the first griddle module is positioned in the exit induction station. The system 100 can also include a retrieval system configured to remove a food product from a griddle module, such as in the form of a paddle and a retrieval actuator that draws the paddle across the lower plate of a griddle module positioned in the exit induction station to collect a food product from the griddle module, as described below.

For example, once the first griddle module is positioned in the exit induction station and once the first food product has reached a sufficient temperature, has been exposed to sufficient heat flux, has cooked for a target period of time, or has cooked for at least a threshold period of time through the set of induction stations, the system 100 can: deactivate the upper and lower coils in the exit induction station; trigger the exit elevation actuator to raise the upper induction head of the exit induction station, thereby raising the upper plate of the first griddle module; and then trigger the retrieval actuator to insert the paddle between the first food product and the lower plate. The retrieval actuator can then retract the paddle from the first griddle module and draw the paddle across a ledge—arranged over a dispense position—to release the first food product from the paddle onto a hamburger bun (or into a box, onto a salad, etc.) below in Block S162. The system 100 can repeat this process for each griddle module that enters the exit induction station.

6. Griddle Module and Hub

Figure 4:
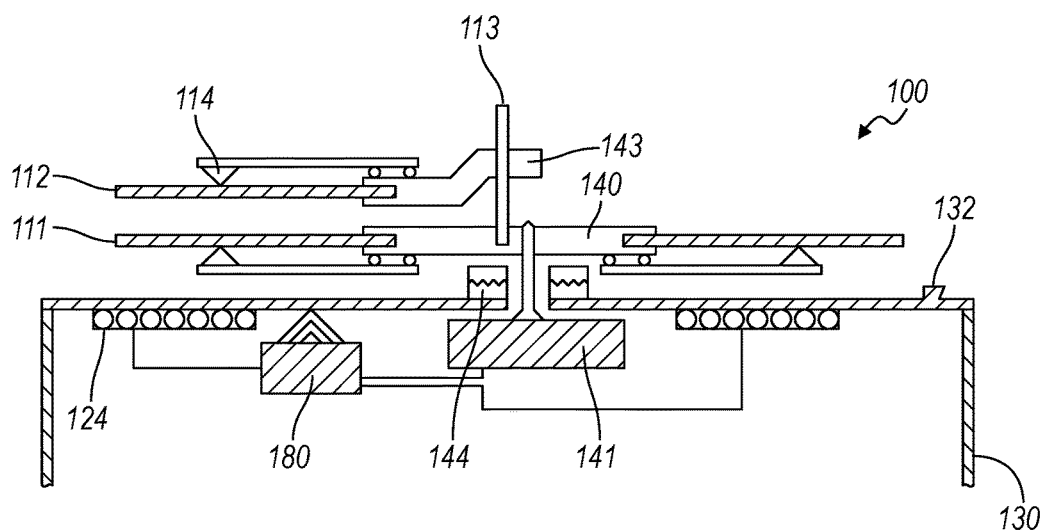
FIG. 4 is a schematic representation of one variation of the system.

As shown in FIGS. 1 and 4, the system 100 includes a first griddle module 110, which includes a lower plate 111 configured to receive a first food product and an upper plate 112 arranged over the lower plate 111 and configured to contact the first food product. Generally, the system 100 includes one or more like griddle modules 110, wherein each griddle module 110 includes an upper plate 112 and a lower plate 111 configured to inductively couple to upper and lower induction coils, respectively, in an adjacent induction station. When the upper coil of an induction station outputs an alternating magnetic field that penetrates the upper plate 112 of an adjacent griddle module 110 (i.e., a griddle module 110 arranged in the induction station), eddy currents form in the upper plate 112, which heat the plate via Joule heating; when similarly powered, the lower coil in the induction station can similarly induce eddy currents in the lower plate 111 of the griddle module 110 to heat the lower plate 111. When positioned within an induction station and thus heated via induction heating, a griddle module 110 can thus form a double-sided (or "clamshell") inductive griddle configured to heat both the top and bottom surfaces of a food product.

In one implementation, the upper plate 112 of a griddle module 110 includes a ferrous (e.g., a steel, a cast iron, ferromagnetic, and/or ferrimagnetic) substrate defining a planar cooking surface coated with a "non-stick" (e.g., low-friction) material, such as a ceramic (e.g., alumina), Polytetrafluoroethylene (PTFE), or perfluorooctanoic acid (PFOA). The upper plate 112 can also include one or more thermal layers between the ferrous substrate and the non-stick coating. For example, the upper plate 112 can include: a ferrous substrate configured to Joule heat in the presence of an oscillating magnetic field output by an upper coil of an adjacent induction station; a copper layer bonded (e.g., brazed, diffusion bonded) over the ferrous substrate and configured to distribute heat across the ferrous substrate; an aluminum layer bonded over the copper layer to define a planar food-safe cook surface; and a non-stick coating applied over the aluminum layer.

In the foregoing implementation, the upper plate 112 can be symmetric about its Y-axis and can define a second planar cooking surface opposite and parallel to the (first) planar cooking surface, wherein the second cooking surface is similarly coated with a non-stick material. Thus, when the non-stick coating on the first cook surface is sufficiently worn, the upper plate 112 can be flipped on the hub—such as manually by an operator following a cleaning cycle—to expose the "fresh" non-stick coating on the second cooking surface. Similarly, the upper plate 112 can be systematically flipped about its Y-axis between operating periods of the automated foodstuff assembly apparatus 200 in order to yield substantially uniform wear of the non-stick coating over time and to extend the useful life of the upper plate 112. In the example above in which the upper plate 112 includes one or more thermal layers over a ferrous substrate, the upper plate 112 can similarly include copper and aluminum layers across the opposite side of the ferrous substrate such that the ferrous substrate defines a ferrous core that heats in the presence of an oscillating magnetic field, and the copper layers can disperse this heat across both sides of the ferrous core.

A griddle module 110 in the system 100 can include a lower plate 111 of the same or similar material(s) and geometry. For example, a griddle module 110 can include identical (e.g., interchangeable) upper and lower plates 112, 111.

The system 100 also includes a hub: configured to support the lower plate 111 and the upper plate 112 of the first griddle module 110 between the barrier and upper coils of the induction stations with the lower plate 111 offset above the barrier and the upper plate 112 offset below upper coils of the induction stations; and configured to sequentially position the first griddle module 110 through the set of induction stations from the entry induction station to the exit induction station 123. Generally, the hub function to support the upper and lower plates 112, 111 of one or more griddle modules 110 between upper and lower induction coils of the induction stations throughout operation of the system 100.

Figure 3:
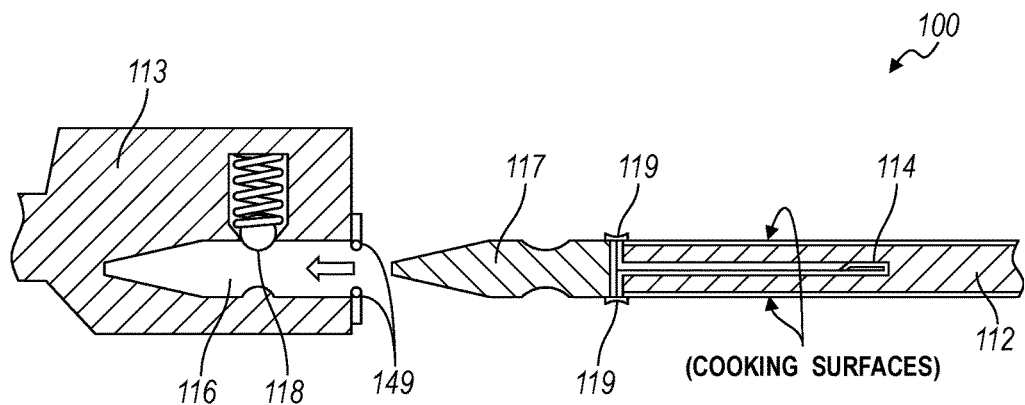
FIG. 3 is a schematic representation of one variation of the system.

In one implementation, the upper plate 112 includes an upper plate receptacle 113 configured to locate the upper plate 112 on the hub between the upper and lower induction coils of the induction stations, as shown in FIGS. 3 and 5. In one implementation, an upper plate receptacle 113 defines a pair of beams extending outwardly from the hub, and a corresponding upper plate 112 defines a circular cast iron platter of uniform thickness fastened to the beams of the upper plate receptacle 113 with one or more threaded fasteners.

In another implementation, the upper plate 112 defines a circular plate with a tongue 117 extending from an edge of the upper plate 112. In this implementation, the distal end of the tongue defines a chamfered lead-in on each broad side and a recess behind each chamfered lead-in, as shown in FIG. 3. The upper plate receptacle 113 defines a receiver 116 that accepts the tongue of the upper plate 112 and a sprung follower 118 that engages the recess on the tongue of the upper plate 112 to constrain the upper plate 112 in the receiver. In this implementation, to install an upper plate 112 in an upper plate receptacle 113, an operator can manually insert the tongue of the upper plate 112 into the receiver; the chamfered lead-in of the tongue can retract the follower as the tongue is inserted into the receiver; and the follower can extend into and engage the recess in the tongue to constrain the upper plate 112 in the receiver once the upper plate 112 is fully inserted into the receiver, thereby locking the upper plate 112 to the upper plate receptacle 113. The operator can then manually draw the upper plate 112 laterally away from the upper plate receptacle 113 to release the follower from the recess and to remove the upper plate 112 from the upper plate receptacle 113, such as to clean the system 100. (Alternatively, the upper plate receptacle 113 can include a pin, magnet, or other element or feature that engages and retains the upper plate.) The upper plate receptacle 113 can also include one or more guide rails that laterally constrain the upper plate.

In one implementation, the system 100 includes: a conveyor system including the hub and a hub actuator 141 that rotates the hub through a sequence of positions corresponding to induction stations; and a set of like griddle modules 110, wherein the upper plate receptacle 113 of each griddle module 110 is configured to transiently install on the hub. For example, the hub can include a set of vertical posts 143, and each upper plate receptacle 113 can include a linear slide configured to engage and to translate linearly along a corresponding post 143 when lifted by an upper induction head 126 in the entry and exit induction stations 121, 123 in Blocks S110 and S160 (or vice versa), as shown in FIGS. 5 and 7. In this example, the hub can include a lower plate 111 receptacle configured to transiently receive the lower plate 111, like the upper plate receptacle 113, but intransiently coupled to the hub, and the upper plate receptacle 113 can be configured to slide vertically along a post 143 of the hub to enable the system 100 to separate the upper plate 112 from the lower plate 111 in Blocks S110 and S160 in preparation to receive and to release a food product, respectively. An upper plate receptacle 113 and upper plate 112 assembly can thus be fully removable from the post 143 by manually drawing the upper plate receptacle 113 vertically upward past the post 143, and the upper plate 112 can be separated from the lower plate 111 receptacle by drawing the lower plate 111 laterally outward, as described above, such as for cleaning. Alternatively, a griddle module 110 can similarly include a lower plate 111 receptacle: that transiently engages the hub, such as over a post 143 extending from the hub and shared with a corresponding upper plate receptacle 113; that supports the lower plate 111; and that can be removed from the hub with the upper plate receptacle 113, such as for cleaning or other servicing.

In the foregoing implementation in which the hub includes one vertical post 143 (or multiple vertical posts) per griddle module 110 and in which a griddle module 110 is configured to slide vertically along its corresponding post 143 on the hub, an upper plate receptacle 113 in a griddle module 110 can further include a skid 116 configured to engage an upper induction head 126 of an adjacent induction station (i.e., the entry induction station, the exit induction station 123) and to loft the upper plate receptacle 113 along its post 143 when the upper induction head 126 is retracted, thereby separating the upper plate 112 from its paired lower plate 111 to receive a new food product at the entry induction station in Blocks S110 and S112 or to release a cooked food product from the griddle module 110 at the exit induction station 123 in Blocks S160 and S162. For example, the entry induction station can include an upper induction head 126 that defines a T-slot concentric with the axis of rotation of the hub, and a griddle module 110 can include a skid 116 defining a T-head configured to enter the T-slot as the griddle module 110 is advanced into the entry induction station; the upper induction head 126 can thus draw the T-head and the upper plate receptacle 113 upward when elevated by the elevation module in the entry induction station in Block S110. The exit induction can define a similar geometry configured to elevate the griddle module 110 in Block S160.

The hub can thus support and locate each lower plate 111 of a griddle module 110 in vertical alignment with its corresponding upper plate 112 and offset vertically above the barrier of the base. In particular, the hub can support lower plates in of the griddle modules 110 out of mechanical contact with the barrier of the base in order to limit conduction of heat from the lower plates 111 into the barrier and into the lower coils. For example, the hub can support lower plates 111 of the griddle modules 110 at a fixed distance above the barrier and offset above lower coils arranged in the base by a distance corresponding to a peak inductive coupling distance for the lower coils.

7. Induction Stations

As shown in FIGS. 1 and 4, an induction station in the system includes a set of induction stations 120 including an entry induction station 121 and an exit induction station 123, wherein each induction station in the set of induction stations 120 includes: a lower coil configured to inductively couple to the lower plate when the first griddle module is arranged in the induction station; and an upper coil configured to inductively couple to the upper plate when the first griddle module is arranged in the induction station. Generally, an induction station in the system 100 includes an upper coil and a lower coil that inductively couple to adjacent upper and lower plates of a griddle module, respectively, when the griddle module is positioned within the induction station.

In one implementation, each induction station can also include one power controller and an electronic oscillator that cooperate to pass a high-frequency alternating current through one or both of the upper and lower coils. When thus powered, the upper coil of the induction station can output a high-frequency alternating magnetic field that penetrates the upper plate in an adjacent griddle module, which thus induces eddy currents in the upper plate. These eddy currents thus formed in the upper plate can then induce heating within the plate, such as by Joule heating and/or by magnetic hysteresis losses. For example, the system 100 can include one power controller and one electronic oscillator per each of the upper and lower coils in an induction station, one power controller and one electronic oscillator per pair of upper and lower coils in an induction station, or any other number or combination of power controllers and electronic oscillators.

An induction station can also include an upper induction head 126 that houses the upper coil of the induction station, as described above. In one implementation, an upper induction head 126 can include a housing hinged to and supported by the base and defining an aperture facing the base. The upper coil of the induction station can be arranged within the housing and can be configured to output an alternating magnetic field through the aperture. Furthermore, the aperture can be closed by a window of a substantially magnetically-transparent material (e.g., window of a material exhibiting relatively minimal ferromagnetism and relatively minimal ferrimagnetism) that physically seals the upper coil within the housing. For example, the window can include a borosilicate transparent glass plate exhibiting a relatively low coefficient of thermal expansion and supported by a flexure extending from the housing. The upper induction head 126 can also include a heat barrier between the upper coil and the non-magnetic window to reduce heat transmission from outside the housing into the upper coil, and the upper induction head 126 can be coupled to a remote air supply that forces air through the upper induction head 126 to actively cool the upper coil.

The upper coil of the entry induction station 121 can be housed in a discrete entry upper induction head 126, and the upper coil of the exit induction station 123 can be similarly housed in a discrete exit upper induction head 126. Upper coils in two or more intermediate induction stations 122 can be ganged into a single housing to form a single upper induction head 126 that spans the multiple intermediate induction stations 122, as shown in FIG. 2. For example, the induction station can include a single housing containing three upper coils for each of three intermediate induction stations 122. Furthermore, the system 100 can support the ganged upper induction head 126 in a static position offset above the base and spanning the intermediate induction stations 122.

Furthermore, the upper induction head 126 of the entry induction station 121 can be coupled to an elevation actuator 127 configured to raise and lower the upper entry induction head to thus raise and lower the upper plate of a griddle module in entry induction station 121 in Block S110; the upper induction head 126 of the exit induction station 123 can be similarly coupled to an elevation actuator 127 configured to raise and lower the upper induction head 126 in Block S160. For example, an upper induction head 126 can be supported over the base by a pair of parallel linkages coupled to a linear or rotatory actuator, as shown in FIG. 1, configured to lift the induction head (and an adjacent upper plate) by a relatively small distance (e.g., 2.0") to accept a new food product in Blocks S110 and S112 or to release a cooked food product in Blocks S160 and S162. Alternatively, like the upper plate receptacle and hub, an upper induction head 126 can slide vertically along a post 143 extending from the base, and a linear actuator, rotatory actuator, and/or linkage system can position the upper induction head 126 along the post 143 in order to separate the upper plate from the lower plate of an adjacent griddle module in Block S110 or Block S160 and/or to set an offset distance or compression height between the upper and lower plates in the adjacent griddle module in Block S182 described below. Individual or ganged upper induction heads 126 in the intermediate induction station(s) 122 can be similarly supported off of the base and can be similarly adjusted vertically to set offset distances or compression heights between the upper and lower plates in adjacent griddle modules in Block S182.

The lower induction coil can be arranged in the base, as described below.

In one implementation, the system 100 includes a number of induction stations equal to its number of griddle modules. In this implementation, the system 100 can load raw food products into griddle modules in the entry induction station 121 in Block S112 and remove cooked food products from griddle modules in the exit induction station 123 in Block S162. For example, the system 100 can include an entry induction station 121, three intermediate induction stations 122, and one exit induction station 123. Alternatively, the system 100 can include one fewer induction station than griddle modules. For example, the system 100 can remove a cooked food product and then reload the griddle module with a raw food product in Blocks S162 and S112, respectively, when the griddle module is positioned in a load/unload position between an entry induction station 121 and an exit induction station 123. In another example, the system 100 can load raw food products into griddle modules in a load position adjacent the entry induction station 121 and unload cooked food products from griddle modules in an unload position adjacent the exit induction station 123 (e.g., between the exit induction station 123 and the load position). However, the system 100 can include any other number of griddle modules and any other number of induction stations in any other suitable configuration. In yet another example, the system 100 can load and unload food products from griddle modules in a single position, such as from the entry induction station 121 (which can thus be physically coextensive with the exit induction station 123).

Furthermore, the system 100 can include a number of griddle modules approximately equivalent to a time required to fully heat (or cook) a food product to done divided by a target rate of done food products output by the system 100. For example, for a hamburger patty of mass necessitating up to 50 seconds to cook to well-done and for a target output rate of one cooked hamburger patty per ten-second interval, the system 100 can include five griddle modules and five induction stations, and the system 100 can implement a static intra-station period of twelve seconds, including ten seconds of active heating and two seconds to advance the griddle modules to a next position per intra-station period. In this example, a sequence of five intra-station periods can thus define one cook cycle for one food product.

8. Base

As shown in FIGS. 1 and 4, the system 100 includes a base 130: including a barrier; supporting a lower coil of an induction station on a first side of the barrier; and supporting an upper coil of an induction station on a second side of the barrier opposite and aligned with the lower coil of the induction station for each induction station in the set of induction stations. Generally, the base 130 houses the lower coils of the induction stations, houses related power controllers and electronic oscillators (e.g., "generator boards"), houses components of the conveyor system, and supports the upper induction heads 126, as described above.

In one implementation, the base 130 defines an enclosure with an aperture facing the upper induction heads 126, and the aperture is enclosed by a barrier, such as a borosilicate glass plate or a barrier of any other suitable material exhibiting low ferromagnetism and/or low ferrimagnetism. The base 130 can house the lower coils and the generator boards inside the enclosure with the lower coils adjacent the barrier and configured to output alternating magnetic fields through the barrier to lower plates of adjacent griddle modules.

9. Conveyor System

As shown in FIG. 1, the conveyor system includes a hub that supports upper and lower plates of griddle modules between the barrier and the upper induction heads of the induction stations. The conveyor system also includes a hub actuator 141 arranged within the base and configured to sequentially index a griddle module from the entry induction station to an intermediate induction station in Block S140 and from the intermediate induction station to the exit induction station in Block S142. Generally, the base houses multiple lower coils and supports multiple upper induction heads, each including an upper coil, and the conveyor system positions griddle modules vertically between induction stations and indexed griddle modules through the set of induction stations as raw food products are sequentially loaded into the griddle modules in the entry induction station, cooked throughout the set of induction stations, and then removed at the exit induction station, such as for assembly with other ingredients into a hamburger.

The hub actuator 141 is arranged within (or is coupled to) the base and supports the hub 140 above the barrier. In one implementation in which the griddle modules and induction stations are patterned radially about the axis of the hub 140, the hub actuator 141 includes an electric motor (e.g., servo motor, stepper motor) and a gearbox, wherein an output shaft of the gearbox is keyed and extends through a bore proximal the center of the barrier of the base to engage and support the hub 140 above. In this implementation, the conveyor system can include a thrust bearing that vertically supports the hub 140 over the barrier, and the conveyor system can also include a seal—arranged about the thrust bearing—that resists ingress of debris (e.g., water, fat, grease) past the barrier and into the base. In this implementation, the system 100 can include a position sensor that outputs a signal corresponding to the angular position of the motor, of the gearbox, of the output shaft, of the hub 140, or of a griddle module, and the system 100 can implement closed-loop feedback techniques to position griddle modules in alignment with the induction stations based on outputs of the position sensor. For example, the conveyor system can include an optical encoder wheel coupled to a keyed shaft and an optical encoder reader adjacent the wheel. The conveyor system can additionally or alternatively include an optical sensor, limit switches, and/or other sensors arranged in a base and/or on an upper induction head and outputting signals corresponding to the angular position of the hub 140; and the system 100 can control the hub actuator 141 to reposition the hub 140 during operation of the system 100 accordingly.

Alternatively, the conveyor system can include gearbox including a Geneva mechanism. In this implementation, the indexing wheel of the Geneva mechanism can be coupled to the hub 140, and the conveyor system can run the hub actuator 141 at a substantially constant speed intermittently rotating the indexing wheel through a sequence of index positions corresponding to the induction stations. In this implementation, the system 100 can set a speed of the hub actuator 141 based on a target intra-station period and an effective gear reduction of the Geneva mechanism, and the conveyor system can implement closed loop controls to maintain the output speed of the hub actuator 141 accordingly.

In Blocks S130 and S132, the system 100 can also deactivate (e.g., cut power to) the upper and lower coils of the induction stations prior to advancing the hub 140—and therefore the griddle modules—to a next angular position in Blocks S140 and S142 in order to prevent the upper coil of a induction module from inductively coupling to the lower coil of the induction module, which may damage a generator board connected to the induction module, as described above.

In one configuration, the hub 140 supports both the upper and lower plates of each griddle module in a radial pattern, and the hub actuator 141 rotates the hub 140 to advance griddle modules—cantilevered off of the hub 140—along an arcuate path through each induction station arranged in a circular pattern about the base, as shown in FIG. 2. In one implementation, the system 100 includes multiple (e.g., five) induction stations arranged in a radial pattern about a center axis of the base; the hub 140 is arranged over an axial center of the barrier and supports upper and lower plates of multiple (e.g., five) griddle modules in a corresponding radial pattern; and the hub actuator 141 rotates the hub 140 through a sequence of angular positions radially offset by 72° to sequentially index the griddle modules through the induction stations. In this configuration, the hub 140 can include multiple (e.g., five) vertical posts, each engaging an upper plate receptacle 113 of one griddle module such that each upper plate receptacle 113 can slide linearly (e.g., vertically) along its corresponding post 143, as described above. For example, the system 100 can raise an upper induction head at the entry induction station to lift an upper plate of a griddle module positioned in the entry induction station, and the upper plate receptacle 113 can slide along its corresponding post 143 in the hub 140 to follow the upper induction head; the system 100 can then lower the upper induction head to release the upper plate toward its lower plate once a new food product has been dispensed onto the lower plate and before (or as) the upper and lower coils of the entry induction station are activated to heat the upper and lower plates, respectively. Upon the conclusion of each intra-station period, the hub actuator 141 rotates the hub 140 forward, thereby advancing each griddle module into a subsequent induction station. When a griddle module enters the exit induction station and a heating period at the exit induction station is completed (e.g., over a portion of the intra-station period), the system 100 elevates the upper induction head of the exit induction station, which draws the upper plate receptacle 113 up its post 143 on the hub 140 to reveal a cooked food product, and the system 100 triggers the retrieval system to collect the food product from the griddle module.

Alternatively, the system 100 can include multiple induction stations arranged in a linear array. In this configuration, the hub 140 can support the upper and lower plates of the griddle modules in a similar linear array, and the hub actuator 141 can linearly advance the griddle modules along the linear array of induction stations. For example, the system 100 can include: a linear array of five induction stations, including an entry induction station, three intermediate induction stations 122, and an exit induction station arranged in a line; ten (or more) griddle modules; a hub including a continuous linear conveyor configured to advance a griddle module from the entry induction station to the exit induction station and to return the griddle module to the entry induction station when driven in a single direction by the hub actuator 141.

However, the system 100 can include any other number of induction stations and griddle modules arranged in any other pattern, array or configuration, and the conveyor system can transition griddle modules through each induction station throughout operation.

11. Insertion System

As shown in FIGS. 6 and 7, one variation of the system 100 includes an insertion system 150 configured to place a food product onto the lower plate of a griddle module positioned in the entry induction station. Generally, the insertion system 150 functions to dispense a food product into a griddle module in the entry induction station in preparation to heat or cook the food product.

In one implementation, the system 100 interfaces with a patty grinding system that grinds chunks of meat, meters discrete masses or volumes of ground meat, and presses meat patties; and the insertion system 150 includes a platen, a pusher, and an actuator that retracts the pusher and the platen into the grinding system to collect a patty, advances the platen into a dispense position between the upper and lower plates of a griddle module in the entry induction station, and then advances the pusher—relative to the platen—to propel the patty off of the platen and onto the lower plate of the griddle module. However, the insertion system 150 can be of any other format and can function in any other way to transfer a food product into a griddle module in the entry induction station in Block S112. In another implementation, the insertion system 150 includes a cup, a piston running within the cup, a boom supporting the cup on one end, and an actuator system. In this implementation, the actuator system positions the cup inside the grinder system, the grinder system loads a food product (e.g., ground meat) into the cup, and the actuator system then advances the cup outside of the grinder system and into the griddle module in the entry induction station, inverts the cup, and drives the piston forward to push the food product out of the cup and onto the lower plate of the griddle module before resetting the piston and cup and returning the cup to the grinder system.

12. Retrieval System

As shown in FIG. 2, the retrieval system 150 includes a paddle 161 and a retrieval actuator 162 that selectively advances the paddle 161 across a lower plate of a griddle module in the exit induction station to retrieve a patty from the lower plate. Generally, the retrieval system 150 includes an arm, a paddle 161, and a retrieval actuator 162 that cooperate to collect a heated or cooked food product from a griddle module in the exit induction station.

In one implementation, the retrieval actuator 162 includes an arm, a paddle 161 cantilevered from the distal end of the arm and drooping slightly downward (e.g., at an angle of 2° from the top surface of the lower plate of an adjacent griddle module) in an initial position, and a retrieval actuator 162 configured to position the arm between a collect position within the exit induction station and a nearby dispense position. In this implementation, to remove a patty from a griddle module at the exit induction station in Block S162, the system 100 triggers an exit elevation actuator 127 to raise the upper induction head of the exit induction module, which catches the skid 116 extending from the upper plate receptacle 113 of the adjacent griddle module and separates the upper plate from its corresponding lower plate. The system 100 then triggers the retrieval actuator 162 to swing or extend the arm toward the exit induction station. As the paddle 161 approaches the griddle module, retrieval actuator 162 drives the leading edge of the paddle 161 downward and into contact with the top surface of the lower plate, thereby deflecting the tip of the paddle 161 upward. The retrieval actuator 162 then drives the paddle 161 toward a backstop on or adjacent the lower plate (as described below), which constrains the food product as the paddle 161 is inserted between the patty and the lower plate. For example, the paddle 161 can define a tip initially declined downward at a first angle below horizontal, and the retrieval actuator 162 can drive the tip of the paddle 161 downward against the top surface of the lower plate in the exit induction station until the tip of the paddle 161 is declined downward at a second angle less than the first angle below horizontal, thereby compressing the tip of the paddle 161 against the top of the lower plate to enable the tip of the paddle 161 to scrape the food product from the lower plate substantially without piercing the food product as the retrieval actuator 162 pivots or extends the paddle 161 laterally (e.g., horizontally) to collect the first food product from the lower plate onto the paddle 161 in Block S162. The retrieval actuator 162 then raises the arm—which raises the paddle 161 and the food product off of the lower plate—and advances the paddle 161 into the dispense position over an adjacent conveyor supporting a box, a plate, or a bun, etc. below. In this implementation, the retrieval system 150 also includes a ledge 163 arranged over the conveyor, and the retrieval actuator 162 sweeps the paddle 161 past the ledge 163, which constrains the food product as the retrieval actuator 162 draws the paddle 161 past the ledge 163, thereby displacing the food product from the paddle 161 and onto a hamburger bun (or into a box, onto a plate, onto a salad, etc.) supported on the conveyor below.

In the foregoing implementation, the ledge 163 can also include an integrated scraper, squeegee, or other like structure configured to wipe or scrape waste—such as grease or loose particles from the food product—from the paddle 161 as the retrieval actuator 162 draws the paddle 161 past the ledge 163. For example, the retrieval actuator 162 can pivot the paddle 161 in a first direction—from the ledge 163 toward the exit induction station—with the tip of the paddle 161 leading to collect a food product from a griddle module in the exit induction station, and the retrieval actuator 162 can then pivot the paddle 161 in an opposite direction—back toward the ledge 163—with the tip of the paddle 161 trailing to draw the paddle 161 past the ledge 163 and integrated scraper, thereby driving the food product and food waste collected on the paddle 161 off of the paddle 161 and toward the conveyor below. Furthermore, in this implementation, the ledge 163 can include two opposing scrapers, squeegees, or other like structures, and the retrieval actuator 162 can draw the paddle 161 through a void between the opposing structures to clean food waste from both sides of the paddle 161. However, the ledge 163 can include any other one or more features configured to dispel food waste from the paddle 161, and the retrieval actuator 162 can manipulate the paddle 161 in any other way and between any other positions to collect a food product from the exit induction station and to dispense the food product onto a hamburger bun, box, or plate, etc.

As described above, a griddle module can also include a backstop configured to prevent a food product arranged on the lower plate from falling off the lower plate and onto the base, such as when the retrieval system 150 retrieves a heated or cooked food product from the lower plate in the exit induction station. For example, for the retrieval system 150 that extends a paddle 161 longitudinally toward the hub to collect a food product from griddle modules in the exit induction station, a lower plate (and the upper plate) in a griddle module can include a backstop extending vertically from its cook surface along a section of the perimeter of the lower plate facing the hub and configured to function as a backstop to prevent a food product from shifting toward the hub and off the lower plate when the retrieval system 150 is actuated to collect the food product in Block S162. Similarly, for the retrieval system 150 that extends a paddle 161 laterally across a lower plate to collect a food product from the lower plate, the lower plate (and the corresponding upper plate) can include a backstop extending vertically from its cook surface along one side of the perimeter of the lower plate opposite the approach direction of the retrieval system 150 to prevent a food product from shifting away from the tip of the paddle 161 as the paddle 161 is driven between the food product and lower plate in Block S162. Alternatively, the hub can include a backstop extending toward the perimeter of the lower plate between the upper and lower plates of the griddle module and can be fixed in position relative to the griddle module. Yet alternatively, the system 100 can include static backstops fixedly (e.g., intransiently) supported by the base adjacent each induction station. However, the system 100 can include one or more backstops of any other form and mounted to any other one or more elements within the system 100.

13. Waste Management

As shown in FIG. 5, one variation of the system 100 includes a waste management system 170 that collects debris (e.g., water, fat, grease) released by food products heated or cooked in the system 100 during operation.

In one implementation in which the base defines a circular or polygonal cross-section and supports induction stations in a radial array, the waste management system 170 includes: a trough arranged about a perimeter of base and defining a valley below the barrier. In this implementation, the waste management system 170 can also include a wiper 142 mounted to the hub (or to a lower plate or lower plate receptacle installed on the hub), extending across a surface of the barrier, and configured to drive food waste deposited onto the barrier toward the trough during rotation of the hub. In particular, the wiper 142 can scrape debris from the surface of the barrier and drive this debris into the trough as the hub rotates. For example, the wiper 142 can include a silicon wiper blade defining a curvilinear profile extending from proximal the center of the hub, past the end of the barrier, and into the trough. In this example, the wiper 142 can also define a curvilinear profile spiraling outward from the center of the hub opposite the direction of rotation of the hub in order to drive waste collecting on the barrier outwardly toward the trough. As the hub actuator rotates the hub, the wiper 142 can thus wipe fats, water, and other waste collecting on the barrier toward the trough, such as to maintain a relatively clean barrier, to manage waste, and/or to maintain substantially consistent inductive coupling between lower coils and adjacent lower plates by removing waste that may otherwise absorb the magnetic fields' output by the lower coils.

In this implementation, the trough can extend along an edge of the barrier and can define a drain, and the waste management system 170 can also include: a collection canister 173; a conduit 172 extending from a base of the trough to the collection canister 173; and a heating element 171 arranged on the conduit 172, as shown in FIG. 5. The collection canister 173 can be arranged in the base below the trough, and the heating element 171 can maintain the temperature of the conduit 172 (and/or the trough and/or the collection canister 173) above a common flow temperature of waste released from food products loaded into the system 100 (e.g., above 160° F., a common flow temperature of meat fat) in order to prevent obstruction of the conduit 172 by cooled and hardened waste. The waste management system 170 can additionally or alternatively include a discrete heating element thermally coupled to the trough and configured to maintain the trough above such a threshold temperature, or the trough can be thermally coupled to the barrier, which can maintain the temperature of the trough above the threshold temperature during operation; the waste management system 170 can similarly include a discrete heating element thermally coupled to the collection canister 173 and configured to maintain the collection canister 173 above such a threshold temperature. However, the waste management system 170 can maintain the trough, the drainage line, and/or the collection canister 173 at an elevated temperature in any other way in order to limit coagulation and collection of fats and other debris in the trough, in the drainage line, and along walls of the collection canister 173.

In this implementation, the waste management system 170 can include additional wipers extending across the barrier—such as arranged in a radial pattern about the hub—and configured to drive debris from the surface of the barrier into the trough. Each wiper 142 can also extend from the surface of the barrier into the trough and can thus drive waste in the trough forward and toward the drain as the hub is rotated, thereby limiting collection of debris in the trough.

14. Plate Scraper

One variation of the system 100 further includes a plate scraper configured to scrape debris from the upper plate and/or the lower plate of a griddle module as the system 100 advances the griddle module from the exit induction station back to the entry induction station in preparation to receive a next food product. Generally, the plate scraper functions to scrape grease, water, grizzle, meat particles, etc. from the upper plate and/or the lower plate in a griddle module as the conveyor system advances the griddle module from the exit induction station back to the entry induction station and in preparation to receive a new food product in Block S112.

In one implementation, the plate scraper is fixedly mounted to the base between the exit induction station and the entry induction station and includes an upper silicon wiper blade (e.g., like the wiper described above) and a lower silicon wiper blade sprung outwardly and configured to scrape the lower surface of the upper plate and the upper surface of the lower plate, respectively, of a griddle module as the hub advances the griddle module from the exit induction station to the entry induction station. Alternatively, the plate scraper can include a static stainless steel bristle brush or an active (e.g., oscillating, rotating) stainless steel bristle brush that scrapes debris from the upper and lower plates as the griddle module is advanced past the plate scraper. The plate scraper can thus passively or actively abrade the cooking surfaces of the upper and lower plates of a griddle module as the griddle module transitions from the exit induction station to the entry induction station, thereby removing waste and reducing a surface contact area of the cooking surfaces to reduce opportunity for a new food product dispensed into the griddle module in Block S112 from sticking to the upper and lower plates of the griddle module.

The system 100 can also include a grease module arranged between the exit and entry induction stations, such as interposed between the plate scraper and the entry induction station. For example, the grease module can include one or more nozzles—arranged between the exit and entry induction stations—that spray water, butter, and/or cooking oil, etc. onto the opposing cooking surfaces of the upper and lower plates of a griddle module as the conveyor system advances the griddle module from the exit induction station to the entry induction stations, such as immediately after the upper and lower plates are scraped by the plate scraper.

15. Temperature Sensing

As shown in FIGS. 3, 4, 6 and 8, one variation of the griddle module includes a temperature sensor 114 that outputs a signal corresponding to the temperature of an upper and/or lower plate in the griddle module, and the system 100 samples the temperature sensor 114 during operation to track the temperature of the upper and/or lower plates and adjusts power outputs of the upper and lower coils of the induction stations accordingly. For example, the system 100 (e.g., the controller 180) can implement closed-loop feedback techniques to modulate the power outputs of the upper and lower coils of the induction stations to achieve a single target temperature of the upper and lower plates of a griddle module, to achieve a sequence of target temperatures in the upper and lower plates of the griddle module, to achieve a target heat flux into a food product arranged in the griddle module, etc. during a cook cycle based on outputs of the temperature sensor(s) 114 and a doneness value specified for the food product. (Alternatively, the system 100 can adjust an intra-station period at an induction station based on outputs of the temperature sensors 114 in order to achieve a doneness value specified for a corresponding food product.)

In one implementation, a griddle module includes a contact-based temperature sensor 114, such as a thermocouple, thermistor, resistance temperature detectors (RTDs), or silicon bandgap temperature sensor in contact with an upper plate in the griddle module. In one example implementation, the upper plate of the griddle module includes: a channel on the back side of the upper plate—opposite a cooking surface—and running from the tongue of the plate, along the back side of the upper plate, to the axial center of the upper plate; a temperature sensor 114 arranged in the channel proximal the axial center of the plate; a sensor plug 119 (or sensor receptacle) arranged on the tongue; electrical leads arranged within the channel and electrically coupled to the temperature sensor 114 and to the sensor plug (or sensor receptacle); potting material arranged over the temperature sensor 114 and the electrical leads within the channel; and a closing insert arranged within the channel and enclosing the temperature sensor 114, electrical leads, and potting material within the channel, as shown in FIG. 3. In this example implementation, the closing insert can be: dovetailed and press-fit into the channel that is similarly dovetailed; welded or brazed into the channel; mechanically fastened in the channel; or constrained within the channel in any other suitable way.

In the foregoing example, the hub can include an upper sensor lead receptacle 149, such as integrated into the upper plate receptacle (shown in FIG. 3) or physically distinct from the upper plate receptacle 113, and the sensor plug extending from the temperature sensor 114 in the upper plate can mate with the upper sensor lead receptacle in the upper plate receptacle of the hub when the upper plate is installed in the upper plate receptacle or when the upper plate and upper plate receptacle assembly are installed on the hub, as shown in FIG. 3. Therefore, the upper plate can include an integrated temperature sensor 114 proximal an axial center of the upper plate and a sensor lead extending laterally from the temperature sensor 114, and the sensor lead can transiently couple to the upper sensor lead receptacle in the hub during operation of the system 100 and can be removed from the sensor lead receptacle with the upper plate, such as for cleaning. The lower plate of the griddle module can similarly include an integrated temperature sensor 114 proximal an axial center of the lower plate and a sensor lead extending laterally from the temperature sensor 114, and this sensor lead can similarly couple to and decouple from a lower sensor lead receptacle in the hub.

In another example, an upper plate in a griddle module defines a blind bore extending laterally from an edge of the plate (e.g., from the tongue) toward the axial center of the upper plate. In this example, the griddle module includes a beam extending from the upper plate receptacle 113 (or from the hub) and terminating in a temperature sensor 114. In this example, the beam can be inserted into the blind bore and can support the temperature sensor 114 inside of and proximal the axial center of the upper plate when the upper plate is installed in its upper plate receptacle 113.

In a similar example, the upper plate defines an open channel across its back side opposite its cooking surface, wherein the open channel (such as defining a dovetail cross-section) extends laterally from an edge of the plate to its axial center; and the griddle module includes a beam (e.g., of a dovetail cross-section) exceeding from the upper plate receptacle 113 (or from the hub) and terminating in a temperature sensor 114. In this example, the beam can be inserted into the dovetail slot in the upper plate as the upper plate is installed in its corresponding upper plate receptacle 113. In this and the foregoing examples, the beam can include a conductive spring tip extending from the temperature sensor 114, and the conductive spring tip can absorb variations in location of the plate relative to the beam over time to maintain sufficient thermal contact between a surface of the upper plate and the temperature sensor 114 during operation.

In yet another example, an upper plate receptacle (or the hub) includes an external beam cantilevered over and sprung downward toward the back side of an upper plate when the upper plate is installed on the hub, as shown in FIG. 4. In this example, the system 100 can include a temperature sensor 114 supported on a distal end of the beam and configured to contact the back surface of the upper plate when the upper plate is installed in its correspond upper plate receptacle. For example, the beam can be of aluminum, of a polymer, or of any other material exhibiting relatively low ferromagnetism and relatively low ferrimagnetism such that the beam—cantilevered between the upper plate and an adjacent coil—is not substantially heated by an oscillating magnetic field output by the adjacent coil, such as by Joule heating. The beam can also be of a substantially minimal cross-section to reduce absorption of the magnetic field output by the adjacent coil, and the beam can include a thermal break (e.g., a polymer insert) arranged between a structural component of the beam and the temperature sensor 114 to thermally isolate the temperature sensor 114 from the structural component of the beam. In this example, the temperature sensors 114 can be similarly cantilevered off the upper induction heads or supported directly by the base. However, the system 100 can include a temperature sensor 114 supported over the back surface of an upper plate and configured to output a signal corresponding to the temperature of the back surface of the upper plate, and the temperature sensor 114 can be fixed relative to the upper plate (e.g., coupled to the hub) and can move with the upper plate as the hub rotates, or the temperature sensor 114 can be fixed relative to the base and can output signals corresponding to temperatures of adjacent upper plates as the hub rotates during operation.

In another implementation, induction stations in the system 100 include contactless temperature sensor 114 that remotely detects the temperature of an upper plate in the griddle module and outputs a signal accordingly. In one example implementation, each griddle module includes a laser or infrared contactless temperature sensor 114, and each coil in each induction station defines a window through its approximate center. In this example implementation, a contactless temperature sensor 114 can be directed through a window in an upper coil of the induction station and can output a signal corresponding to the temperature of the back surface of the upper plate of a griddle module currently in the induction station. Similarly, a contactless temperature sensor 114 can sense the temperature of an adjacent lower plate through the barrier via a window through the center of the lower coil. In this example implementation, the material of the non-magnetic window of the upper induction head and the material of the barrier of the base can be substantially transparent to electromagnetic radiation within a relatively narrow wavelength band, and the temperature sensors 114 can include laser or infrared contactless temperature sensors configured to operate within this same wavelength band.

In this variation, the system 100 can include one contact-based or contactless temperature sensor for each upper plate and lower plate in each griddle module. For example, for a system with five induction stations and five griddle modules, the system 100 can include ten temperature sensors 114, such as one temperature sensor 114 integrated into each of the five upper plates and lower plates and electrically coupled to sensor lead receptacles in the hub. In this example, all ten temperature sensors 114 can be substantially identical and arranged within the system 100 in substantially the same way (e.g., integrated into or separate from and cantilevered toward a corresponding plate). Alternatively, the system 100 can include different types of temperature sensors, such as five contactless (e.g., infrared) lower temperature sensors 114 arranged within the base and configured to output signals corresponding to the temperatures of adjacent lower plates and five contact-based upper temperature sensors 114 cantilevered off of the hub, contacting the back surfaces of the upper plate receptacles, and configured to output signals corresponding to temperatures of upper plates.

In the foregoing variations in which the system 100 includes temperature sensors 114 integrated into plates or supported off of the hub or plate receptacles, the system 100 can further include a slip ring assembly 144—as shown in FIGS. 4 and 6—arranged between the hub and the base and configured to communicate signals from the temperature sensors 114 into the base, such as to the controller 180 arranged within the base. For example, for the system 100 that includes five griddle modules, five induction stations, five upper plates, five lower plates, and ten temperature sensors 114, the hub can include a slip ring assembly including one ground ring and ten sense rings, including one sensing ring per temperature sensor 114 configured to communicate an analog temperature signal from a temperature sensor 114 to the controller 180 in the base. Alternatively, the system 100 can include a signal processing unit (SPU) arranged within the hub, and the SPU can sample each of these temperature sensors 114, transform analog temperature signals into digital temperature values, and then transmit these digital temperature values via a limited number of channels (e.g., low-current data lines) in the slip ring assembly to the controller 180. For example, in this implementation, the slip ring assembly can include one ground ring, one power ring to supply power to the SPU, and one or more data rings over which the SPU transmits digital temperature values for all temperature sensors 114 into the base (e.g., over I2C communication protocol).

In a similar implementation, the system 100 includes a wireless transmitter arranged within the hub, coupled to the SPU, and configured to wirelessly broadcast digital temperature values from the SPU to a remote wireless receiver, such as within the base and electrically coupled to the controller 180. In this implementation, the SPU and the wireless transmitter can be powered by a rechargeable battery transiently installed within the hub. Alternatively, the wireless transmitter and the SPU can be powered by an inductive energy harvester arranged within or coupled to the hub, configured to harvest energy from a magnetic field output by dedicated inductive coil in the base or in an upper induction head or to siphon energy from magnetic fields output by coils in the induction stations, and to condition (e.g., rectify) this energy to power the wireless transmitter and/or to charge a battery in the hub while the system 100 is in operation.

16. Controller and Temperature Control

As shown in FIG. 5, one variation of the system 100 includes a controller 180 configured to control the positions of a griddle module in the induction stations via the hub actuator and to control the power output of coils in the induction stations during a cook cycle. For example, the controller 180 can modulate power outputs of upper and lower coils in the induction stations based on a position of the griddle module and a temperature value received from the temperature sensors in order to achieve a target heat flux into a food product, to achieve a target temperature of the food product, and/or to achieve a target temperature or temperature profile of the upper and lower plates of the griddle module containing the food product corresponding to a doneness value selected for the food product.

In this variation, the system 100 can be configured to cook a food product to a single doneness value (e.g., "medium" or "medium-well") corresponding to a total target heat flux through the upper and lower plates in a griddle module, calculated as the sum of the integral of temperatures of the upper plate of the griddle module and the integral of temperatures of the corresponding lower plate during a cook cycle. The controller 180 can also calculate or implement a total target intra-station heat flux, such as calculated by multiplying the total target heat flux by the intra-station period and dividing this product by the total time of a cook cycle. Thus, during a cook cycle, the controller 180 can sample temperature sensors coupled to or integrated into the upper and lower plates of a griddle module containing a food product, such as at a rate of 1 Hz; during each intra-station period in which the griddle module is positioned within an induction station, the controller 180 can implement closed-loop feedback controls to modulate the power outputs of coils in the induction station to achieve the total target intra-station heat flux upon expiration of the intra-station period and before shifting the griddle module forward to a next induction station. The controller 180 can thus independently control power outputs of each coil in each induction station to achieve a total target heat flux through the upper and lower plates of a griddle module during a cook cycle to achieve a single doneness value of a food product.

The controller 180 can also store multiple discrete doneness values for food products. For example, the controller 180 can store discrete preset total target heat flux values (and/or preset target intra-station heat flux values) for each of "rare," "medium-rare," "medium," "medium-well," and "well-done" doneness values. In one example in which the system 100 is integrated into an automated foodstuff assembly apparatus, the automated foodstuff assembly apparatus 200 can receive a hamburger order from a patron, wherein the hamburger order specifies a doneness—selected from the foregoing set of five available doneness values—for a hamburger patty. In this example, the controller 180 receives a request to prepare a hamburger patty of this doneness value from the automated foodstuff assembly apparatus 200 and then selects a total target heat flux value (and/or target intra-station heat flux value) corresponding to this specified doneness for the hamburger patty. Once an adjacent grinder system grinds, presses, and dispenses a new hamburger patty onto the lower plate of a griddle module in the entry induction station, the controller 180 modulates the outputs of the upper and lower coils of the entry induction station to achieve the target intra-station heat flux value at the induction station during a first intra-station period; the controller 180 then repeats this process for each intermediate induction station and for the exit induction station to produce a hamburger patty at the specified doneness upon conclusion of the cook cycle; the system 100 then releases the cooked hamburger patty to a hamburger bun, box, plate, or other container in Block S162.

Alternatively, the controller 180 can implement a parametric model to calculate total target heat flux values (and/or target intra-station heat flux values) for quantitative (e.g., rather than qualitative) doneness values selected from a continuum of quantitative doneness values. In one example shown in FIG. 8, a patron can generate a hamburger order within an ordering interface executing on a mobile computing device (e.g., a smartphone) or at a local kiosk connected to the automated foodstuff assembly apparatus; within the ordering interface, the patron can manipulate a slider along a slider bar to select a doneness value for a hamburger patty in the patron's hamburger order, such as quantitative doneness value between 1 and 100 along a 100-increment slider bar. Upon receipt of this hamburger order, the automated foodstuff assembly apparatus 200 can distribute a request for a new hamburger patty—cooked to the selected doneness value—to the controller 180, and the controller 180 can calculate the total target heat flux value and/or target intra-station heat flux value for the hamburger patty by passing the selected quantitative doneness value into a parametric model. The controller 180 can then modulate the power outputs of coils in the induction stations throughout a cook cycle to achieve the total target heat flux value and/or target intra-station heat flux value for the hamburger patty before releasing the cooked hamburger patty in Block S162 for assembly with other ingredients specified in the patron's hamburger order.

The system 100 can also be configured to receive food products of different sizes in Block S112, and the controller 180 can select and implement a total target heat flux value and/or a preset target intra-station heat flux value for a food product based on its size. For example, the system 100 can receive hamburger patties from a grinder system in Block S112, wherein the grinder system is configured to grind and press patties of two different sizes, such as one-quarter-pound and one-half-pound hamburger patties; and the controller 180 can select a preset total target heat flux value and/or a preset target intra-station heat flux value for a hamburger patty based on a size of the hamburger patty such as either a first heat flux for one-quarter-pound hamburger patties or a second heat flux less than the first heat flux for one-half-pound hamburger patties.

Similarly, the system 100 can also be configured to receive food products of different types in Block S112, and the controller 180 can select and implement a preset total target heat flux value and/or a preset target intra-station heat flux value for a food product based on its types. For example, a grinder system can be configured to grind 100% beef hamburger patties, 100% turkey hamburger patties, and 50% beef/50% turkey hamburger patties; and the controller 180 can select a preset total target heat flux value and/or a preset target intra-station heat flux value for a hamburger patty based on its composition, such as including a first heat flux for 100% beef hamburger patties, a second heat flux less than the first heat flux for 50% beef/50% turkey hamburger patties, and a third heat flux less than the second heat flux for 100% turkey hamburger patties.

The controller 180 can additionally or alternatively select a preset total target heat flux value and/or a preset target intra-station heat flux value for a food product based on the fat content (or protein content, etc.) of the food product. For example, the controller 180 can access nutritional data entered from a container of meat loaded into the adjacent grinder system for an average or actual fat content of this volume of meat and then select a preset total target heat flux value and/or a preset target intra-station heat flux value for hamburger patties formed from this volume of meat. In this example, the automated foodstuff assembly apparatus 200 can include a scanner (e.g., a barcode scanner, an RFID scanner) configured to retrieve data from a container of meat loaded into the grinder system, can interface with an external (e.g., a handheld) scanner to access such data scanned from the container, can receive a meat type and/or meat data (e.g., fat content, protein content) entered manually by an operator through an integrated or connected user interface, or access these data in any other way, and the controller 180 can then implement a first heat flux for hamburger patties with 10% fat content and can implement a second heat flux greater than the first heat flux for hamburger patties with 20% fat content.

Similarly, the controller 180 can select a preset total target heat flux value and/or a preset target intra-station heat flux value for a food product based on a level of compaction or density of the food product. For example, the grinder can be configured to compact ground meat to one of two compaction levels to form a hamburger patty, such as a loose compaction for rare hamburger patties and a tight compaction for well-done hamburger patties. In this example, the controller 180 can: select a first intra-station heat flux value for a loose compaction patty assigned a rare doneness value; select a second intra-station heat flux value greater than the first intra-station heat flux value for a loose compaction patty assigned a medium-rare doneness value; select a third intra-station heat flux value for a tight compaction patty assigned a medium doneness value; and select a fourth intra-station heat flux value greater than the third intra-station heat flux value for a tight compaction patty assigned a well-done doneness value.

The controller 180 can also select a preset total target heat flux value and/or a preset intra-station heat flux value for a food product based on the initial temperature of the food product. For example, the controller 180 can sample outputs of a temperature sensor installed within the grinder system to determine the initial temperature of a hamburger patty and then implement a first heat flux for hamburger patties within a first initial temperature range and can implement a second heat flux greater than the first heat flux for hamburger patties within a second initial temperature range less than the first initial temperature range. The controller 180 can implement similar methods and techniques to select a preset total target heat flux value and/or a preset target intra-station heat flux value for a food product based on the initial temperatures of the upper and lower plates in a griddle module when loaded with a new food product in Block S112.

In the foregoing implementations, the controller 180 can access and implement one or more lookup tables containing preset total target heat flux values and/or preset target intra-station heat flux values for various combinations of food product sizes, selected doneness values, food product compaction level or density, food product compositions, initial food product temperatures, initial upper and lower plate temperatures, etc., as shown in FIG. 8. Alternatively, the system 100 can implement one or more parametric models to determine an intra-station target heat flux for a food product. For example, the controller 180 can pass a hamburger patty size, a selected doneness value, an intra-grinder compaction value, a hamburger patty composition (e.g., meat type, fat content, protein content), a hamburger patty compaction level or density, an initial hamburger patty temperature, and/or initial upper and lower plate temperatures, etc. directly into a parametric module to calculate an intra-station target heat flux for a new hamburger patty before or as the hamburger patty is loaded into a griddle module in the entry induction station in Block S112. Thus, in this example, the system 100 can implement a parametric model to calculate target temperatures of the first lower plate and the first upper plate at each of the entry induction station, the intermediate induction station, and the exit induction station based on a fat and protein composition of the first food product including a ground meat patty, a compaction value of the first food product, an initial temperature of the first food product, and a duration of the cook cycle or intra-station period. Alternatively, the controller 180 can pass one or more of the foregoing parameters into one or more lookup tables to retrieve corresponding coefficients and then pass these coefficients into a parametric model to calculate an intra-station target heat flux for a food product.

In the foregoing implementations, the controller 180 can also select or calculate induction station-specific intra-station target heat flux values for a food product. For example, the controller 180 can select and implement a high heat flux value for the entry induction station to sear the top and bottom of a hamburger patty during the first intra-station period of a cook cycle and then select and implement lower heat flux values for the intermediate and exit induction stations to cook the hamburger patty through its thickness before releasing the hamburger patty in Block S162, as shown in FIG. 8. The controller 180 can thus select or calculate a target heat flux over a static intra-station period at each induction station to heat or cook a food product to a selected doneness for the food product over the course of a cook cycle.

Furthermore, the controller 180 can translate an intra-station target heat flux into a single target temperature or a sequence of target temperatures for the upper and lower plates of a griddle module throughout a cook cycle, as shown in FIG. 8, and the controller 180 can implement closed-loop feedback techniques to modulate the power outputs of the upper and lower coils of the induction stations in order to achieve these target temperatures in the upper and lower plates of the griddle module. In this variation, the method 100 can include: calculating target temperatures of the first lower plate and the first upper plate at each of the entry induction station, the intermediate induction station, and the exit induction station based on a doneness value assigned to the first food product in Block S110; tracking actual temperatures of the first lower plate and the first upper plate in the first griddle module between the first period of time and the sixth period of time in Block S172; and modulating power outputs of lower coils and upper coils of the entry induction station, the intermediate induction station, and the exit induction station based on differences between the target temperatures and the actual temperatures of the first lower plate and the first upper plate in Blocks S120, S122, and S124, etc., and the controller 180 can implement these Blocks of the method 100 throughout a cook cycle.

The controller 180 can thus modulate the power outputs of the upper and lower coils of the induction station—thereby controlling a heat flux from the upper and lower plates of a griddle module—during a cook cycle based on outputs of a temperature sensor thermally coupled to the upper and lower plates, a doneness value specified for a food product, and/or various other measured or entered parameters throughout a cook cycle of static duration, as shown in FIG. 8. The controller 180 can additionally or alternatively vary the duration of a cook cycle or an intra-station period to cook a food product to a specified doneness. For example, the controller 180 can immediately open a griddle module upon entry into the exit induction station in Block S160 and trigger the retrieval system to retrieve a food product contained therein in Block S162 if the food product is assigned a rare doneness level; and the controller 180 can supply power to the upper and lower coils of the exit induction station for a full intra-station duration before triggering the retrieval system to retrieve a food product contained therein in Block S162 if the food product is assigned a well-done doneness level.

For the system 100 that includes multiple griddle modules, the controller 180 can simultaneously and independently control the power outputs of each induction station module to achieve a target heat flux (or target plate temperatures) at each griddle module during each intra-station period in order to cook each food product to a specified doneness level independent of other food products simultaneously in process in the system 100. For example, the controller 180 can implement methods and techniques described above to simultaneously process a rare hamburger patty, a medium-rare hamburger patty, a medium hamburger patty, a medium-well hamburger patty, and a well-done hamburger patty.

For example, the controller 180 can execute the foregoing Blocks of the method 100 for each griddle module and induction station in the system 100 and can repeat this process as the hub conveyor moves griddle modules through sequential induction stations in order to achieve a target doneness for each hamburger patty exiting the system 100. In this example, the controller 180 can receive an order for a hamburger patty, including a doneness specification for the hamburger patty, and the controller 180 can select a temperature profile for the hamburger patty based on the doneness specification. In this example, a temperature profile can be specific to a particular doneness specification and can define a target temperature of the upper and lower plates at each induction station, such as based on the intra-station period and a known transition time between induction stations. In this example, a temperature profile can also define a peak target temperature for the upper and lower plates of a griddle module when the griddle module is arranged within the entry induction station, and the temperature profile can define a minimum temperature of the upper and lower plates when the griddle module is arranged in the exit induction station such that the upper and lower plates can be quickly and actively heated to a new peak temperature specific to a temperature profile of a subsequent hamburger patty to be loaded into the griddle module once the griddle module is advanced into the entry station, thereby reducing or eliminating a wait time for the upper and lower plates to cool to an entry target temperature when the griddle module releases a well-done patty and prepares to receive a new patty with a 'rare' specification.

However, the controller 180 can implement any other controls or techniques to control the power outputs of coils in the induction stations.

17. Dynamic Plate Offset

In one variation shown in FIG. 7, the method 100 includes Block S180, which recites, calculating a compression distance for the first food product based on the doneness value assigned to the first food product, and Block S182, which recites driving a compression actuator 128 coupled to the upper coil in the intermediate induction station to a target position corresponding to the compression distance in order to set a maximum compression of the first food product between the first lower plate and the first upper plate in the intermediate induction station. Generally, in this variation, the controller 180 can calculate a target compression distance for a product based on a doneness value selected for or assigned to the food product and can drive an elevation actuator 127 (or a compression actuator 128, as described below) to a target vertical position corresponding to the target compression distance for the food product in order to control a cook rate of the food product.

In this variation, a griddle module includes a compression actuator 128 that functions to adjust an offset height between opposing cooking surfaces of the upper and lower plates of a griddle module. In particular, by actively compressing the upper and lower plates of a griddle module, the system 100 can cook a food product at an increased rate. Similarly, by lowering a stop between the upper and lower plates of the griddle module and permitting the upper plate to compress a food product below, the system 100 can cook a food product at an increased rate. The system 100 can therefore actively compress the upper plate of a griddle module or control the position of a lower stop for the upper plate in the griddle module in order to control the cook rate of a food product loaded into the griddle module.

In one implementation in which an upper plate receptacle includes a skid 116 configured to couple to an adjacent upper induction head and in which the system 100 includes an elevation actuator 127 configured to set the vertical position of the upper induction head, the elevation actuator 127 can shift the vertical position of the upper induction head to a position corresponding to a minimum offset distance between the opposing cooking surfaces of the upper and lower plates of the adjacent griddle module. For example, if the minimum offset distance between the opposing cooking surfaces of the upper and lower plates of the griddle module is less than the current thickness of the food product, the weight of the upper plate and upper plate receptacle can draw the upper plate downward to compress the food product onto the skid 116 bottom on the upper induction head, thereby setting a maximum compression distance for the food product. The elevation actuator 127 can thus function as a compression actuator 128.

In the foregoing implementation, a skid 116 extending from the upper plate receptacle of the griddle module can thus extend up to and over a top surface of the upper induction head and can draw the upper plate upward (i.e., away from the lower plate) as the elevation actuator 127 raises the upper induction head. Similarly, when the elevation actuator 127 drops the upper induction head, the skid 116 can lower with the upper induction head, thus lowering the upper plate back toward the lower plate. Furthermore, once the upper plate reaches and is supported vertically by the food product below, the controller 180 can continue to drive the upper induction head downward to a position corresponding to the target compression distance; the upper induction head can thus contact the top surface of the upper plate and force the upper plate downward, thereby compressing the food product, as shown in FIG. 7. For example, the upper induction head can be supported by a parallel four-bar linkage and counterweighted (e.g., with a gas strut), and the elevation actuator 127 can be coupled to the parallel four-bar linkage to actively raise and lower the upper induction head such that the upper induction head remains substantially parallel to the barrier throughout its travel range. In another example, the upper induction head is mounted directly to a linear actuator configured to raise and lower the upper induction head along a vertical linear trajectory.

The system 100 can thus receive a food product, such as in the form of a thick hamburger patty, at a griddle module positioned in the entry induction station in Block S112, and the controller 180 can then adjust the height of the upper induction head of the entry induction station to actively compress the food product to a target thickness, as shown in FIG. 7. By compressing the upper plate onto the food product, the system 100 can: ensure sufficient contact between the upper plate and the food product to heat or cook the food product within the cook cycle; and control a thickness of the food product, which may affect the final doneness level of the food product for a given heat flux during a cook cycle (e.g., a thicker hamburger patty may be less done than a thinner hamburger patty given identical cook cycles). In one implementation, the system 100 includes a single compression actuator 128 coupled to the entry upper induction head, and the controller 180 can calculate a target thickness for a hamburger patty loaded in a griddle module positioned therein based on the doneness level specified for the hamburger patty and then drive the entry induction station downward to compress the food product to this target thickness. In this implementation, the system 100 can exclude compression actuators 128 at other induction stations such that the upper plate of the griddle module compresses the food product due to its own weight when positioned in subsequent induction stations in the system 100, and the controller 180 can thus accommodate for a number of induction stations in the system 100, a weight of the upper plate and upper plate receptacle, and the size (e.g., the weight) of the hamburger patty when calculating the target thickness of the hamburger patty in the entry induction station. Alternatively, the system 100 can include a compression actuator 128 at the exit induction station, and the controller 180 can implement similar methods and techniques to calculate a final target thickness of the hamburger patty to finish cooking the hamburger patty and can drive the compression actuator 128 in the exit induction station to a corresponding vertical position before the hamburger patty is released in Block S162. Yet alternatively, the system 100 can include compression actuators 128 at multiple induction stations, and the controller 180 can actively set the positions of each of these compression actuators 128 throughout a cook cycle in order to achieve a target thickness and/or specified doneness of a food product upon conclusion of a cook cycle.

In another implementation, the compression actuator 128 includes an electric motor or a pneumatic cylinder that adjusts a vertical position of a lower stop that defines a lowest available position of an upper plate relative to its corresponding lower plate. For example, the hub can include a lower stop configured to set a lower travel limit of an upper plate receptacle, and the compression actuator 128 can be mounted or coupled to the hub and can directly adjust the vertical position of the lower stop. Similarly, the upper plate receptacle can include a skid 116 that vertically couples the upper plate receptacle to an upper induction head above, the base can include a lower stop configured to set a lower travel limit of an upper induction head, and the compression actuator 128 can be distinct from the elevation actuator 127 and can be configured to adjust the vertical position of this lower stop to set a vertical position of the upper induction head during an intra-station period.

In this variation, the controller 180 can also control the height of an upper plate of a griddle module (e.g., by controlling the position of a corresponding compression actuator 128 and/or a position of the corresponding upper induction head) based on a doneness specification for a food product loaded into the griddle module. In one example, for a hamburger patty assigned a 'well-done' specification, the controller 180 can trigger the compression actuator 128 to drive the upper plate toward the lower plate of the griddle module to reduce the offset between opposing cooking surfaces of the upper and lower plates, thereby compressing the hamburger patty (or enabling the upper plate to lower toward the lower plate to compress the hamburger patty), reducing the thermal distance between the center of the patty and the upper and lower plates, and yielding a higher center temperature in the hamburger patty for a given cook time. In this example, for a patty assigned a 'rare' specification, the controller 180 can trigger the compression actuator 128 to drive the upper plate of the griddle module away from the lower plate to increase the offset distance between the opposing cooking surfaces of the upper and lower plates, thereby yielding a thicker patty, a greater thermal distance between the center of the patty and an adjacent plate, and yielding a lower center temperature for a given cook time. The controller 180 can thus actively position the upper plate of a griddle module or actively set a compression limit for a griddle module throughout a cook cycle in order to achieve a doneness level specified for a food product loaded into the griddle module.

Alternatively, a griddle module can include a mechanical or gas spring 115 arranged between the hub and an upper plate receptacle and configured to resist compression of a patty in the griddle module due to the weight of the upper plate and the upper plate receptacle assembly, as shown in FIG. 5. In particular, in this implementation, the spring 115 can be selected for a spring 115 constant (at a typical operating temperature when the system 100 is in operation) to achieve a target compression of a patty in the griddle module by the weight of the upper plate and the upper plate receptacle. For example, the system 100 can include a spring 115 arranged between an upper plate and the hub and configured to counter compression of the first food product between the upper plate and the lower plate due to a weight of the upper plate; and a stop coupled to the hub and defining a lower position limit of the upper plate relative to the lower plate.

As a person skilled in the art will recognize from the previous detailed description and from the figures and claims, modifications and changes can be made to the embodiments of the invention without departing from the scope of this invention as defined in the following claims.

We claim:

1. A system for cooking a food product comprises:
   a first griddle module comprising
      a lower plate configured to receive a first food product and
      an upper plate arranged over the lower plate and configured to contact the first food product;
   a set of induction stations comprising an entry induction station and an exit induction station, each induction station in the set of induction stations comprising
      a lower coil configured to inductively couple to the lower plate when the first griddle module is arranged in the induction station and
      an upper coil configured to inductively couple to the upper plate when the first griddle module is arranged in the induction station;
   a base
      comprising a barrier,
      supporting the lower coils of the set of induction stations on a first side of the barrier, and
      supporting the upper coils of the set of induction stations on a second side of the barrier opposite the lower coils of the set of induction stations,
      wherein, for each induction station of the set of induction stations, the upper coil of the induction station is aligned with the lower coil of the induction station;
   a hub
      configured to support the lower plate and the upper plate of the first griddle module between the barrier and the upper coils of the set of induction stations, the lower plate offset above the barrier and the upper plate offset below the upper coils of the set of induction stations, and
      configured to sequentially position the first griddle module at each of the set of induction stations from the entry induction station to the exit induction station; and
   a controller configured to drive the lower coils and the upper coils of the set of induction stations based on a position of the first griddle module relative to the set of induction stations to heat the first food product between the lower plate and the upper plate.

2. The system of claim 1, wherein:
   during a first period of time, the hub positions the first griddle module between the lower coil and the upper coil of the entry induction station;
   during a second period of time succeeding the first period of time, the hub repositions the first griddle module between the lower coil and the upper coil of a second induction station of the set of induction stations adjacent the entry induction station; and
   between the first period of time and the second period of time, the controller deactivates the lower coils and the upper coils of the entry induction station and the second induction station.

3. The system of claim 1, wherein:
   the set of induction stations are patterned radially about an axial center of the hub;
   the system further comprises a second griddle module;
   at a first time, the hub (i) positions the first griddle module in alignment with the entry induction station to receive the first food product and (ii) positions the second griddle module in alignment with the exit induction station to release a second food product; and
   at a second time succeeding the first time, the hub (i) positions the first griddle module in alignment with a second induction station of the set of induction stations adjacent the entry induction station to heat the first food product and (ii) positions the second griddle module in alignment with the entry induction station to receive a third food product.

4. The system of claim 1, further comprising a retrieval system comprising a paddle and a retrieval actuator configured to, when the first griddle module is positioned in the exit induction station, advance the paddle across the lower plate of the first griddle module to collect a patty from the lower plate.

5. The system of claim 4, wherein:
   the paddle defines a tip initially declined downward at a first angle below horizontal;
   the retrieval actuator drives the tip of the paddle downward against a top surface of the lower plate of the first griddle module positioned in the exit induction station until the tip of the paddle is declined downward at a second angle less than the first angle below horizontal; and
   the retrieval actuator pivots the paddle horizontally to move the first food product from the lower plate onto the paddle.

6. The system of claim 5, wherein:
   the retrieval system further comprises a ledge arranged over a dispense position; and
   the retrieval actuator is configured to draw the paddle along the ledge to drive the first food product off of the paddle and into a container disposed below the paddle.

7. The system of claim 1, wherein:
   the lower plate comprises a ferrous substrate and a non-stick coating;
   the upper plate comprises a ferrous substrate and a non-stick coating;
   the hub comprises a lower plate receptacle configured to transiently receive the lower plate; and
   the upper plate comprises an upper plate receptacle configured to transiently engage the hub and to coaxially align with the upper plate and with the lower plate.

8. The system of claim 7, wherein:
the hub comprises a sensor lead receptacle;
the upper plate further comprises a temperature sensor proximal an axial center of the upper plate and a sensor lead extending laterally from the temperature sensor,
the sensor lead is transiently coupled to the sensor lead receptacle of the hub;
the hub transmits a value from the temperature sensor to the controller; and
the controller modulates power outputs of the upper coils in the set of induction stations based on a position of the first griddle module within the set of induction stations, a temperature value received from the temperature sensor, and a doneness value selected for the first food product arranged in the first griddle module.

9. The system of claim 1, wherein:
the hub comprises a linear slide coupled to the upper plate of the first griddle module, and
the upper plate of the first griddle module is configured to translate vertically along the linear slide relative to the lower plate of the first griddle module.

10. The system of claim 9, further comprising:
a spring arranged between the upper plate and the hub, wherein the spring counters compression of the first food product between the upper plate and the lower plate due to a weight of the upper plate; and
a stop coupled to the hub, wherein the stop defines a lower position limit of the upper plate relative to the lower plate.

11. The system of claim 9, further comprising:
a compression actuator,
wherein the controller calculates a target compression distance for the first food product based on a doneness value selected for the first food product, and
wherein the controller drives the compression actuator to a target vertical position corresponding to the target compression distance for the first food product.

12. The system of claim 1, further comprising an elevation actuator proximal the entry induction station and configured to separate the upper plate of the first griddle module from the lower plate of the first griddle module to receive the first food product on the lower plate.

13. The system of claim 1, further comprising:
a trough extending along an edge of the barrier;
a collection canister;
a conduit extending from a bottom of the trough to the collection canister;
a heating element arranged on the conduit; and
a wiper mounted to the hub, extending across a surface of the barrier, and configured to drive food waste deposited onto the barrier toward the trough during rotation of the hub.

14. The system of claim 1, wherein a space is disposed between the lower coils of the set of induction stations and the lower plate of the first griddle module in a direction parallel to an axis about which the first griddle module rotates relative to the lower coils.

\* \* \* \* \*

UNITED STATES PATENT AND TRADEMARK OFFICE
CERTIFICATE OF CORRECTION

PATENT NO. : 9,788,687 B2
APPLICATION NO. : 15/157267
DATED : October 17, 2017
INVENTOR(S) : Frehn et al.

It is certified that error appears in the above-identified patent and that said Letters Patent is hereby corrected as shown below:

In the Specification

Column 4, Line 22    "wo" should be --100--

Column 6, Line 52    "no." should be --110.--

Column 11, Line 66   "in" should be --111--

Column 27, Line 26   "S110" should be --S170--

Signed and Sealed this
Thirty-first Day of May, 2022

Katherine Kelly Vidal
*Director of the United States Patent and Trademark Office*